US005723074A

United States Patent [19]
Balachandran et al.

[11] Patent Number: 5,723,074
[45] Date of Patent: *Mar. 3, 1998

[54] OXYGEN ION-CONDUCTING DENSE CERAMIC

[75] Inventors: Uthamalingam Balachandran, Hinsdale; Mark S. Kleefisch, Plainfield, both of Ill.; Thaddeus P. Kobylinski, Prospect, Pa.; Sherry L. Morissette, Las Cruces, N. Mex.; Shiyou Pei, Naperville, Ill.

[73] Assignee: Amoco Corporation, Chicago, Ill.

[*] Notice: The term of this patent shall not extend beyond the expiration date of Pat. No. 5,580,497.

[21] Appl. No.: 626,119

[22] Filed: Apr. 1, 1996

Related U.S. Application Data

[63] Continuation-in-part of Ser. No. 212,251, Mar. 18, 1994, Pat. No. 5,580,497, which is a continuation-in-part of Ser. No. 48,668, Apr. 16, 1993, Pat. No. 5,356,728.

[51] Int. Cl.⁶ .................................................. H01B 1/06
[52] U.S. Cl. .......................... 252/519; 252/521; 429/33; 429/193; 204/295; 204/421; 501/123; 501/135
[58] Field of Search .................................. 252/519, 521; 429/33, 193; 204/295, 421; 501/123, 135

[56] References Cited

U.S. PATENT DOCUMENTS

| | | | |
|---|---|---|---|
| 4,562,124 | 12/1985 | Ruka | 429/193 |
| 5,240,473 | 8/1993 | Carolan et al. | 95/54 |
| 5,580,497 | 12/1996 | Balachandran et al. | 252/519 |

*Primary Examiner*—Paul Marcantoni
*Attorney, Agent, or Firm*—Thomas A. Yassen; Robert E. Sloat

[57] ABSTRACT

Preparation, structure, and properties of mixed metal oxide compositions and their uses are described. Mixed metal oxide compositions of the invention have stratified crystalline structure identifiable by means of powder X-ray diffraction patterns. In the form of dense ceramic membranes, the present compositions demonstrate an ability to separate oxygen selectively from a gaseous mixture containing oxygen and one or more other volatile components by means of ionic conductivities.

16 Claims, 12 Drawing Sheets

OXYGEN ION-CONDUCTING DENSE CERAMIC

CROSS-REFERENCE TO RELATED APPLICATIONS

This application is a continuation-in-part of application Ser. No. 08/212,251 filed Mar. 18, 1994, now U.S. Pat. No. 5,580,497, which is a continuation-in-part of application Ser. No. 08/048,668 filed Apr. 16, 1993, now U.S. Pat. No. 5,356,728, which applications are specifically incorporated herein in their entirety by reference.

TECHNICAL FIELD

The present invention relates to preparation, structure, and properties of mixed metal oxide compositions which in the form of a dense ceramic membrane demonstrate an ability to separate oxygen selectively from a gaseous mixture containing oxygen and one or more other volatile components by means of ionic conductivities. In particular, crystalline mixed metal oxide composition of the present invention are represented by $$D_\alpha E_{\alpha+\beta} O_\delta$$

where D and E are chemically reactive elements independently selected from specified groups, α and β are numbers such that $$1.1 < (\alpha+\beta)/\alpha \leq 6,$$

and δ a is a number which renders the compound charge neutral. Crystalline mixed metal oxide compositions of the present invention have stratified crystalline structure identifiable by means of powder X-ray diffraction patterns. Dense ceramic membranes of the present invention which are made of the mixed metal oxide, exhibit electron conductivity and oxygen ion conductivity.

The invention includes dense ceramic membranes comprising the aforesaid mixed metal oxides having electron conductivity and oxygen ion conductivity, processes in which such oxygen permeable membranes are used in separation apparatus for transfer of oxygen from an oxygen-containing first gaseous mixture having a relatively higher oxygen partial pressure to a second gaseous mixture having a relatively lower oxygen partial pressure and preferably containing one or more components, more preferably including organic compounds which react with oxygen. Particular aspects of the present invention include preparation, structure, and properties of mixed metal oxide compositions containing at least strontium, cobalt, iron and oxygen.

There are numerous reactions involving a gaseous reactant in which a material selectively permeable to such gaseous reactant could be employed to separate the desired gaseous reactant from a first gaseous atmosphere having a relatively high partial pressure of the desired reactant and to transport the separated reactant into a second gaseous atmosphere having a relatively low partial pressure of the separated reactant where the desired reaction then takes place. An essential feature of such selectively permeable material is that it retain its ability to separate and transport the desired reactant for an adequate period of time.

This invention relates to chemical reactors useful to control partial oxidation reactions of organic compounds to added-value products. For example, this invention relates to cross-flow chemical or electrochemical reactor cells containing oxygen permeable materials which have both electron conductivity and oxygen ion conductivity, and cross-flow reactors and chemical processes using cross-flow reactor cells having oxygen permeable monolithic cores to control and facilitate transport of oxygen from an oxygen-containing gas stream to another gas stream containing organic compounds in which react with the transported oxygen. These cross-flow electrochemical reactor cells comprise either a hollow ceramic blade positioned across a gas stream flow or a stack of crossed hollow ceramic blades containing a channel or channels for flow of gas streams. Each channel has at least one channel wall disposed between a channel and a portion of an outer surface of the ceramic blade or a common wall with adjacent blades in a stack comprising a gas-impervious mixed metal oxide compositions comprising strontium, cobalt, iron and oxygen having a specified characteristic powder X-ray diffraction pattern. In contrast to conventional fuel cells, cross-flow reactors according to this invention are free of means for completion of an external electric circuit.

The invention includes reactors comprising first and second zones separated by gas-impervious mixed metal oxide material having electron conductivity and oxygen ion conductivity. Preferred gas-impervious materials comprise at least one mixed metal oxide compositions comprising strontium, cobalt, iron and oxygen having a specified characteristic powder X-ray diffraction pattern. Also, the invention includes oxidation processes controlled by using these reactors. Reactions conducted in cross-flow reactors according to this invention do not require an external source of electrical potential or any external electric circuit for oxidation to proceed.

BACKGROUND OF THE INVENTION

U.S. Pat. No. 3,630,879 issued Dec. 28, 1971, in the name of Spacil et al., describes a solid oxygen ion electrolyte cell structure having a cylindrical form free of electrical conductors said to be useful to generate hydrogen gas by dissociation of water. Patentees describe the structure as a thin continuous cylinder of "internally short-circuited" solid oxygen ion material having a first continuous porous electrode over its inner surface and a second continuous porous electrode over its outer surface.

Ounalli et al. in "Hydrogen Production By Direct Thermolysis Of Water On Semipermeable Membrane", C.R. Acad Sci. Paris. t. 292 pp. 1185–1190 (1981), report use of a single phase mixed conductor as an oxygen semipermeable membrane. A membrane of calcia stabilized zirconia at temperatures in a range of 1400° C. to 1800 ° C. is stated to extract oxygen from steam to produce hydrogen, and that oxygen was transported through the membrane.

U.S. Pat. No. 4,330,633 issued May 18, 1982, in the name of Yoshisato et al., describes a solid electrolyte said to selectively separate oxygen from a gaseous atmosphere having a high oxygen partial pressure into a gaseous atmosphere having a low oxygen partial pressure. Patentees describe the solid electrolytes as composed of a sintered body consisting essentially of an oxide of cobalt, an oxide of at least one metal selected from strontium and lanthanum, and an oxide of at least one metal selected from bismuth and cerium.

U.S. Pat. No. 4,659,448 issued Apr. 21, 1987, in the name of Gordon, describes a process for removal of $SO_x$ and $NO_x$ from flue gases using a solid state electrochemical ceramic cell. Patentee states that the process requires application of an external electrical potential to electro-catalytically reduce $SO_x$ and $NO_x$ to elemental sulfur and free nitrogen gas.

Oxygen apparently is removed through the solid electrolyte in what amounts to electrolysis.

U.S. Pat. No. 4,791,079 issued Dec. 13, 1988, in the name of Hazbun, describes a mixed ion and electron conducting catalytic ceramic membrane said to be useful in hydrocarbon oxidation or dehydrogenation processes. Patentee describes the membrane as consisting of two layers, one of which is an impervious mixed ion and electron conducting ceramic layer and the other is a porous catalyst-containing ion conducting ceramic layer. This impervious mixed ion and electron conducting ceramic membrane is further described at column 2, lines 57–62, as yttria stabilized zirconia which is doped with sufficient cerium oxide, $CeO_2$, or titanium oxide, $TiO_2$, to impart electron conducting characteristics to the ceramic.

Numerous publications describe conventional fuel cells which completely oxidize methane to carbon dioxide and water. Fuel cells are not designed to control partial oxidation processes which produce added-value products, but rather to generate electricity from fuel gas and air (or oxygen). Processes conducted in fuel cells are selected for complete oxidation of fuel to relatively valueless combustion products and require completion of an external electric circuit for oxidation of fuel gas to proceed. See, for example, U.S. Pat. No. 4,476,196 issued Oct. 9, 1984, in the name of Poeppel et al., U.S. Pat. No. 4,476,198 issued Oct. 9, 1984, in the name of Ackerman et al., or U.S. Pat. No. 4,883,497 issued Nov. 28, 1989, in the name of Claar et al.

U.S. Pat. No. 4,877,5063 issued Oct. 31, 1989, in the name of Fee et al., describes an electrically operated, solid electrolyte oxygen pump having a one-piece, monolithic ceramic structure said to afford high oxygen production per unit weight and volume and thus particularly adapted for use as a portable oxygen supply. Patentees describe the one-piece structure as comprised of thin ceramic layers of cell components including air electrodes, oxygen electrodes, electrolyte layers, and interconnection materials. The oxygen pump is not designed to conduct chemical processes, but rather to remove oxygen from air to form a higher concentration of oxygen. The processes transferring oxygen across a solid electrolyte barrier in the oxygen pump require an external electric circuit including a source of electrical potential, DC voltage across the electrodes, for transfer to proceed.

European Patent Application 90305684.4, published on Nov. 28, 1990, under Publication No. EP 0 399 833 A1 in the name of Cable et al., describes an electrochemical reactor using solid membranes comprising: (1) a multi-phase mixture of an electronically-conductive material, (2) an oxygen ion-conductive material, and/or (3) a mixed metal oxide of a perovskite structure. Reactors are described in which oxygen from oxygen-containing gas is transported through a membrane disk to any gas that consumes oxygen. Flow of gases on each side of the membrane disk in the reactor shell shown are symmetrical flows across the disk, substantially radial outward from the center of the disk toward the wall of a cylindrical reactor shell. The gases on each side of the disk flow parallel to, and co-current with, each other.

Materials known as "perovskites" are a class of materials which have an X-ray identifiable crystalline structure based upon the structure of the mineral perovskite, $CaTiO_3$. In its idealized form, the perovskite structure has a cubic lattice in which a unit cell contains metal ions (A) at the corners of the cell, another metal ion (B) in its center and oxygen ions at the center of each cube face. In known crystalline materials of the perovskite class, the unit cell repeats, without interruption throughout a crystal, in all three orthogonal directions of a suitably oriented rectangular coordinate system. This cubic lattice is identified as an $ABO_3$-type structure where A and B represent metal ions. In the idealized form of perovskite structures, generally, it is required that the sum of the valences of A ions and B ions equal 6, as in the model perovskite mineral, $CaTiO_3$.

Many materials having the perovskite-type structure ($ABO_3$-type, i.e., where β is zero) have been described in recent publications including a wide variety of multiple cation substitutions on both the A and B sites said to be stable in the perovskite structure. Likewise, a variety of more complex perovskite compounds containing a mixture of A metal ions and B metal ions (in addition to oxygen) are reported. Publications relating to perovskites include: P. D. Battle et al., J. Solid State Chem., 76, 334 (1988); Y. Takeda et al., Z. Anorg. Allg. Chem., 550/541, 259 (1986); Y. Teraoka et al., Chem. Lett., 19, 1743 (1985); M. Harder and H. H. Muller-Buschbaum, Z. Anorg. Allg. Chem., 464, 169 (1980); C. Greaves et al., Acta Cryst., B31, 641 (1975).

However, a recurring problem that is common to many such compositions and membranes is that they often tend to break, fracture, and/or a undergo phase change and thereby to lose their ability to selectively separate and/or transport the desired gaseous material, after relatively short period of time under commercial conditions of operation, i.e., pressure drop across the membrane, elevated temperatures of operation, changes of temperature, temperature differentials, and the like.

SUMMARY OF THE INVENTION

In broad aspect, the present invention includes preparation, structure, and properties of mixed metal oxide compositions which in the form of a dense ceramic membrane demonstrate an ability to separate oxygen selectively from a gaseous mixture containing oxygen and one or more other volatile components by means of their ionic conductivities. Crystalline mixed metal oxide composition of present invention are, typically, represented by $$D_{\alpha}E_{\alpha+\beta}O_{\delta} \tag{I}$$

where D comprises at least one metal selected from the group consisting of magnesium, calcium, strontium, and barium, E comprises at least one element selected from the group consisting of vanadium, chromium, manganese, iron, cobalt, and nickel, α is a number in a range from about 1 to about 4, typically, about 1 or about 4; β is a number in a range upward from 0 to about 20, preferably in a range from about 0.1 to about 6; more preferably such that $$1.1 < (\alpha+\beta)/\alpha < 6, \tag{II}$$

and δ is a number which renders the compound charge neutral. Dense ceramic membranes comprising the crystalline mixed metal oxide composition exhibit electron conductivity and oxygen ion conductivity, and ability to separate oxygen selectively from a gaseous mixture containing oxygen and one or more other volatile components by means of ionic conductivities.

Crystalline mixed metal oxide compositions according to the present invention have an integral stratified atomic structure of at least two different alternating layers identifiable by means of powder X-ray diffraction pattern analysis. The integral crystalline structure has a regular atomic arrangement of relatively dense strata formed of a basic unit repeating, without interruption throughout a single crystal, in only two orthogonal directions of an appropriately oriented rectangular coordinate system. Relatively dense strata are held apart by relatively less dense bridging strata of a different basic repeating unit in the integral crystalline structure. Stratified crystalline structures of the present invention demonstrate improved thermal stability and form, therefore, more durable dense ceramic membranes which exhibit electron conductivity and oxygen ion conductivity.

Advantageously, the integral crystalline structure comprises layers having a perovskite structure and bridging layers having a different structure. Such crystalline mixed metal oxide compositions are particularly desirable for use to separate oxygen selectively from a gaseous mixture containing oxygen and one or more other volatile components by means of their ionic conductivities.

In one aspect, the invention is a crystalline mixed metal oxide composition represented by $$(D_{1-y}M'_y)_\alpha E_{\alpha+\beta} O_\delta \quad (III)$$

where D is a metal selected from the group consisting of magnesium, calcium, strontium, and barium, M' comprises at least one other metal selected from the group consisting of magnesium, calcium, strontium, barium, yttrium, lanthanum, copper, zinc, silver, cadmium, gold, and mercury, with the proviso that D and M' are different independently selected metals, E is at least one element selected from the group consisting of vanadium, chromium, manganese, iron, cobalt, and nickel. y is a number in a range upward from about 0.01 to about 0.95, preferably from 0.1 to about 0.5, and where $\alpha$, $\beta$ and $\delta$ are numbers as previously defined.

In another aspect, the invention is a crystalline mixed metal oxide composition represented by $$D_\alpha(E_{1-x}G_x)_{\alpha+\beta} O_{67} \quad (IV)$$

where D is a metal selected from the group consisting of magnesium, calcium, strontium, and barium, E is an element selected from the group consisting of vanadium, chromium, manganese, iron, cobalt, and nickel, G comprises at least one other element selected from the group consisting of vanadium, chromium, manganese, iron, cobalt, nickel, niobium, molybdenum, technetium, ruthenium, rhodium, palladium, indium, tin, antimony, rhenium, lead, and bismuth, with the proviso that E and G are different independently selected elements, x is a number in a range from about 0.01 to about 0.95, preferably from 0.1 to about 0.8, and where $\alpha$, $\beta$ and $\delta$ are numbers as previously defined.

The mixed metal oxide compositions have a stratified crystalline structure comprises layers having a perovskite-type atomic arangement and layers having another type atomic arangement identifiable by means of powder X-ray diffraction patterns. The compositions are such that a dense ceramic membrane comprising the mixed metal oxide exhibits electron conductivity and oxygen ion conductivity, and ability to separate oxygen selectively from a gaseous mixture containing oxygen and one or more other volatile components, by means of electron conductivity and oxygen ion conductivity.

In yet another aspect, the invention is a crystalline mixed metal oxide composition represented by $$(D_{1-y}M'_y)\alpha(E_{1-x}G_x)\alpha+\beta O_\delta \quad (V)$$

where D is a metal selected from the group consisting of magnesium, calcium, strontium, and barium, M' is a metal selected from the group consisting of magnesium, calcium, strontium, barium, copper, zinc, silver, cadmium, gold, and mercury, E is an element selected from the group consisting of vanadium, chromium, manganese, iron, cobalt, and nickel, G is an element selected from the group consisting of vanadium, chromium, manganese, iron, cobalt, nickel, niobium, molybdenum, technetium, ruthenium, rhodium, palladium, indium, tin, antimony, rhenium, lead, and bismuth, with the proviso that D, E, G and M' are different independently selected. The numbers y, x, $\alpha$, $\beta$ and $\delta$ are as previously defined, and the composition has a stratified crystalline structure which comprises layers having a perovskite-type atomic structure and layers having another type atomic structure identifiable by means of a powder X-ray diffraction pattern. Powder X-ray diffraction patterns of preferred compositions of this aspect of the invention comprise significant lines substantially as described in Table I.

The mixed metal oxide compositions have an integral crystalline structure consisting of strata having a perovskite-type atomic arangement alternating with strata having another type atomic arangement identifiable by means of powder X-ray diffraction patterns. The compositions are such that a dense ceramic membrane comprising the mixed metal oxide exhibits electron conductivity and oxygen ion conductivity, and ability to separate oxygen selectively from a gaseous mixture containing oxygen and one or more other volatile components, by means of electron conductivity and oxygen ion conductivity.

In another aspect, the present invention is an inorganic crystalline material comprising strontium, iron, cobalt and oxygen, preferably having a powder X-ray diffraction pattern comprising significant lines substantially as described in Table I. Advantageously the crystalline mixed metal oxide demonstrates oxygen ionic conductivity and electronic conductivity. The invention includes method of preparation for the crystalline mixed metal oxide compositions containing at least strontium, cobalt, iron and oxygen. The invention also includes use of the crystalline mixed metal oxides in dense ceramic membranes having electron conductivity and oxygen ion conductivity, as well as their use in separation of oxygen from an oxygen-containing gaseous mixture. Typically in such processes the aforesaid membranes are used in separation apparatus for transfer of oxygen from an oxygen-containing first gaseous mixture having a relatively higher oxygen partial pressure to a second gaseous mixture having a relatively lower oxygen partial pressure and preferably containing one or more components, more preferably including organic compounds which react with oxygen. An essential feature of such selectively permeable dense ceramic membrane is that it retain its ability to separate oxygen for an adequate period of time at the conditions of operation.

In one aspect, the invention is a crystalline mixed metal oxide composition represented by $$Sr_\alpha(FE_{1-x}Co_x)_{\alpha+\beta} O_\delta \quad (VI)$$

where x is a number in a range from 0.01 to about 1, preferably in a range from about 0.1 to about 0.8, more preferably in a range from about 0.3 to about 0.7; $\alpha$ is a number in a range from about 1 to about 4, typically, about 1 or about 4; $\beta$ is a number in a range upward from 0 to about 20, preferably in a range from about 0.1 to about 6; more preferably such that $$1<(\alpha+\beta)/\alpha\leq 6,$$

and $\delta$ is a number which renders the compound charge neutral. Advantageously, the crystalline mixed metal oxide composition represented by formula I has a powder X-ray diffraction pattern comprising significant lines substantially as described in Table I.

In another aspect, the invention is a crystalline mixed metal oxide composition represented by $$(Sr_{1-y}M_y)_\alpha(Fe_{1-x}Co_x)_{\alpha+\beta}O_\delta \quad \text{(VII)}$$

where and M is a metal selected from the group consisting of elements having atomic number in a range from 56 to 71, calcium (atomic number 20), and yttrium (atomic number 39). y is a number in a range from about 0.01 to about 0.95, preferably in a range from about 0.1 to about 0.5; x, $\alpha$, $\beta$, and $\delta$ are independently determined numbers as previously defined. Advantageously, the crystalline mixed metal oxide composition represented by formula II has a powder X-ray diffraction pattern comprising significant lines substantially as described in Table I.

In another aspect, the invention is a crystalline mixed metal oxide composition represented by $$Sr_4(Fe_{1-x}Co_x)_6O_\delta \quad \text{(VIII)}$$

where x and $\delta$ are numbers as previously defined and the crystalline mixed metal oxide composition represented by formula III has a powder X-ray diffraction pattern comprising significant lines substantially as described in Table I.

In another aspect, the invention is an oxygen permeable dense ceramic membrane comprising a crystalline mixed metal oxide composition represented by a formula selected from the group I to VIII, inclusive. Such dense ceramic membranes exhibit, advantageously, oxygen ionic conductivity, and electronic conductivity. Preferably, at elevated temperatures, dense ceramic membranes of the invention demonstrate oxygen permeation ranging from about 0.01 cm³/min. at standard conditions per cm² of membrane wall area to about 100 cm³/min. at standard conditions per cm² of membrane wall area.

In yet another aspect, the invention is a process of making the crystalline mixed metal oxide composition represented, preferably, by a formula selected from the group consisting of VI, VII, and VIII, which comprises dispersing in a liquid medium a source of strontium(II) ion, a source of cobalt(III) ions, a source of iron oxide, removing substantially all the liquid from the mixture to form a superficially dry solid, and calcining the superficially dry solid at a temperature in a range from about 600° C. to about 1200° C.

In further aspect, the invention is a process comprising:

(A) Providing a dense ceramic membrane permeable to oxygen comprising a crystalline mixed metal oxide composition according to the present invention and/or represented by a formula selected from the group consisting of I to VIII, inclusive, the membrane having two surfaces;

(B) Contacting a first surface of the membrane with an oxygen-containing gaseous mixture having a relatively higher oxygen partial pressure;

(C) Contacting a second surface of the membrane with a gaseous composition having a relatively lower oxygen partial pressure or optionally containing no oxygen; and (D) Permitting oxygen to be transported through the membrane from the oxygen-containing gaseous mixture having a relatively higher oxygen partial pressure into the gaseous composition having a relatively lower oxygen partial pressure or containing no oxygen.

Applicants' processes for selective oxygen separation from an oxygen-containing gaseous mixture are, preferably, carried out with an oxygen peremable dense ceramic membrane comprising a crystalline mixed metal oxide composition represented by a formula selected from the group consisting of I to VIII, preferably a formula selected from the group consisting of VI to VIII, inclusive. The oxygen peremable dense ceramic membranes of this invention exhibit high oxygen fluxes at relatively low temperature, preferably oxygen permeation in a range upward from about 0.01 cm³/min. at standard conditions per cm² of membrane wall area. Typically, the dense ceramic membrane oxide exhibits electron conductivity and oxygen ionic conductivity. These membranes may be prepared by conventional techniques, and exhibit other desirable properties under process condition, including good chemical and thermal stability.

As indicated below, the oxygen peremable dense ceramics of this invention can be used for electrochemical reactors to control partial oxidation reactions of organic compounds to added-value products. For example, this invention relates to cross-flow chemical or electrochemical reactor cells containing oxygen permeable materials which have both electron conductivity and oxygen ion conductivity (this is the subject of commonly assigned U.S. Pat. No. 5,356,728 to Balachandran et al., which is hereby incorporated by reference).

As is generally known, the assigned strengths in X-ray diffraction patterns may vary depending upon the characteristics of the sample. The observed line strength in any particular sample may vary from another sample, for example, depending upon the amounts of each crystalline phase, oxygen content, and/or amorphous material in a sample. Also, X-ray diffraction lines of a particular crystalline material may be obscured by lines from other materials present in a measured sample.

TABLE I

| Principal XRD Lines | |
|---|---|
| Interplanar Spacing d, Å [1] | Assigned Strength |
| 9.52 ± .05 | Weak |
| 3.17 ± .05 | Weak |
| 2.77 ± .05 | Medium–Strong |
| 2.76 ± .05 | Medium–Strong |
| 2.73 ± .03 | Very Strong |
| 2.08 ± .03 | Weak–Medium |
| 1.96 ± .02 | Medium |
| 1.90 ± .02 | Weak–Medium |
| 1.592 ± .009 | Weak–Medium |
| 1.587 ± .009 | Medium |
| 1.566 ± .009 | Weak |

[1] Angstroms

As stated herein above, materials known as "perovskites" are a class of materials which have an X-ray identifiable crystalline structure based upon the structure of the mineral perovskite, $CaTiO_3$. In its idealized form, the perovskite structure has a cubic lattice in which a unit cell contains metal ions (A) at the corners of the cell, another metal ion (B) in its center and oxygen ions at the centers of each cube face. This cubic lattice is identified as an $ABO_3$-type structure where A and B represent metal ions. In the idealized form of perovskite structures, generally, it is required that the sum of the valences of A ions and B ions equal 6, as in the model perovskite mineral, $CaTiO_3$.

If $\beta$, which according to the present invention is a number in a range upward from 0.1, could have the value of zero, the perovskite mineral, $CaTiO_3$, could be represented by $$D_\alpha E_{\alpha+\beta}O_\delta$$

provided, of course, D were calcium, E were titanium, α were 1, and δ were 3 which δ would render the perovskite mineral charge neutral.

BRIEF DESCRIPTION OF THE DRAWINGS

The appended claims set forth those novel features which characterize the present invention. The present invention itself, as well as advantages thereof, may best be understood, however, by reference to the following brief description of preferred embodiments taken in conjunction with the annexed drawings, in which:

BRIEF DESCRIPTION OF THE INVENTION

Figure 1:
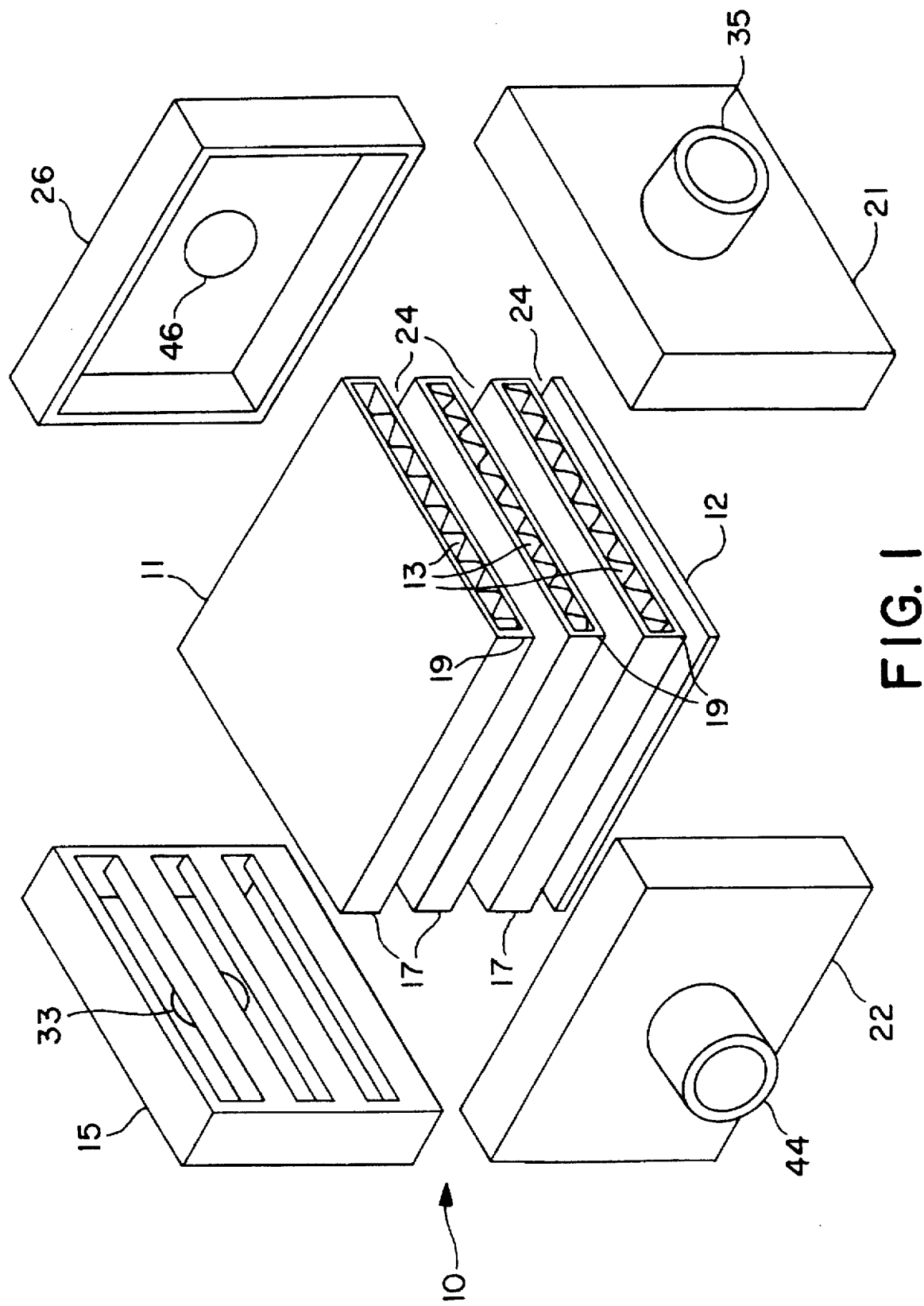
FIG. 1 is an exploded perspective view of one embodiment of a cross-flow reactor in accordance with the present invention.

Any of a variety of methods may be used to make inorganic crystalline material described herein above having an integral stratified atomic structure which, in the form of a dense ceramic membrane comprising the inorganic crystalline material, exhibits electron conductivity and oxygen ion conductivity and ability to separate oxygen selectively from a gaseous mixture containing oxygen and one or more other volatile components by means of ionic conductivities. Crystalline mixed metal oxide materials in accordance with the present invention have, preferably, a powder X-ray diffraction pattern comprising significant lines substantially as shown in Table I, e.g., inorganic crystalline material comprising strontium, iron, cobalt and oxygen. Suitable methods include perpetration from oxides and/or thermal decomposition of precursor compounds selected from a group consisting of acetates, carbonates, chlorides, nitrates of the above-described metal ions.

Examples of useful precursor compounds include; magnesium acetate, magnesium chloride, magnesium carbonate, magnesium oxide, calcium acetate, calcium carbonate, calcium chloride, calcium nitrate, calcium oxide, barium acetate, barium carbonate, barium chloride, barium nitrate, copper acetate, copper chloride, copper nitrate, copper oxide, zinc acetate, zinc carbonate, zinc chloride, zinc nitrate, zinc oxide, silver acetate, silver carbonate, silver chloride, silver nitrate, silver oxide, cadmium acetate, cadmium carbonate, cadmium chloride, cadmium nitrate, cadmium oxide, gold chloride, gold oxide, mercury chloride, mercury nitrate, mercury oxide, vanadium chloride, vanadium nitride, vanadium oxide, chromium acetate, chromium chloride, chromium nitrate, chromium oxide, manganese acetate, manganese carbonate, manganese chloride, manganese nitrate, manganese oxide, nickel acetate, nickel carbonate, nickel chloride, nickel nitrate, nickel oxide, iron acetate, iron chloride, iron nitrate, iron oxide, cobalt acetate, cobalt carbonate, cobalt chloride, cobalt nitrate, cobalt oxide, strontium carbonate, strontium chloride, strontium nitrate, lanthanum acetate, lanthanum carbonate, lanthanum chloride, lanthanum nitrate, lanthanum oxide, cerium acetate, cerium carbonate, cerium chloride, cerium nitrate, cerium oxide, praseodymium acetate, praseodymium chloride, praseodymium nitrate, praseodymium oxide, neodymium acetate, neodymium chloride, neodymium nitrate, neodymium oxide, samarium acetate, samarium chloride, samarium nitrate, samarium oxide, europium acetate, europium carbonate, europium chloride, europium nitrate, europium oxide, gadolinium acetate, gadolinium chloride, gadolinium nitrate, gadolinium oxide, terbium acetate, terbium carbonate, terbium chloride, terbium nitrate, terbium oxide, dysprosium acetate, dysprosium chloride, dysprosium nitrate, dysprosium oxide, holmium carbonate, holmium chloride, holmium nitrate, holmium oxide, erbium acetate, erbium carbonate, erbium chloride, erbium nitrate, erbium oxide, thulium acetate, thulium carbonate, thulium chloride, thulium nitrate, thulium oxide, ytterbium acetate, ytterbium chloride, ytterbium nitrate, ytterbium oxide, lutetium acetate, lutetium chloride, lutetium oxide, and mixtures thereof.

As one example, of the invention, a crystalline mixed metal oxide composition represented by a formulae I, II, and III, and an oxygen ion-conducting dense ceramic membrane are made by a process which comprises the steps of (A) forming an intimate multi-phase mixture of an aqueous and/or organic liquid having a low normal boiling point temperature and precursor compounds selected from a group consisting of acetates, carbonates, nitrates and oxides of strontium, cobalt, and iron.

(B) calcining the mixture to temperatures in a range upward from about 500° C. to form the desired ceramic material.

(C) crushing the ceramic material to form a ceramic powder, (D) forming an intimate multi-phase mixture of an aqueous and/or organic liquid having a low normal boiling point temperature, the ceramic powder, and additives selected from the group consisting of binders, dispersants, plasticizers, and combinations thereof.

(F) forming the mixture into a desired shape, and
(G) sintering the formed mixture to temperatures in a range upward from about 800° C. to form a dense ceramic having electron conductivity and oxygen ion conductivity.

In the above processes for making powders and dense ceramic membranes, the water and/or organic liquids having a low normal boiling point temperature include polar organic solvents having normal boiling point temperatures in a range downward from about 250° C., preferably downward from about 100° C., such as alcohols and chlorinated hydrocarbons.

Advantageously, in the above processes for making dense ceramic membranes, additives selected from the group consisting of binders, dispersants, plasticizers, and combinations thereof are added to the mixture prior to forming the mixture into a desired shape. Such additive agents are preferably materials which do not interfere with formation of a dense ceramic membrane in the final step of sintering the formed mixture and the one or more additives dispersed in the mixture. Such additives are known and commercially available.

Additional formation and/or modification of crystalline structure may occur under conditions of use in oxygen separation apparatus using a dense ceramic membrane comprising mixed metal oxides according to the invention.

Any method of dense ceramic membrane fabrication suitable to the desired embodiment can be employed. Suitable adaptations of methods for formation of ceramic solid oxide fuel cells and/or monolithic solid ceramic electrolyte oxygen pumps may be used, i.e., omitting provision for use of an external source of electrical potential or any external electric circuit. Advantageously, a hollow ceramic blade may be formed by extrusion of a plastic materials which are subsequently fired. A process for fabricating ceramic materials for use in cross-flow cells may include the steps of forming the appropriate materials into corrugated structures to provide gas flow channels, and layering, bonding, and co-firing the flat and corrugated cell components together to form a monolithic cell. Arrangements for fabrication of a monolithic ceramic core and/or cell array are disclosed, for example, in U.S. Pat. No. 4,883,497 to Claar et al and U.S. Pat. No. 4,877,506 to Fee et al. Each of these references is hereby incorporated by reference for their disclosure relating to ceramic core fabrications. Selection and use of such methods of fabrication is well within the ability of one of ordinary skill to obtain a desired shape without undue experimentation.

Advantageously, in the above processes for making a dense ceramic membrane, additives selected from the group consisting of binders, dispersants, plasticizers, and combinations thereof are added to the mixture prior to forming the mixture into a desired shape. Such additive agents are preferably materials which do not interfere with formation of a dense and solid core in the final step of sintering the formed mixture and the one or more additives used are capable of being easily dispersed in the mixture. Selection and use of such commercially available additives is well within the ability of one of ordinary skill to obtain a desired shape without undue experimentation.

Suitable catalysts for processes according to this invention in which synthesis gas is made from methane, ethane, and other light hydrocarbon gases can be used and include commercial catalysts for steam reforming of methane and other hydrocarbons. Advantageously, catalyst compositions useful for the production of synthesis gas are resistant to coke formation when used to catalyze the reaction of a hydrocarbyl compound with oxygen from an oxygen-containing gas at elevated temperatures to form synthesis gas. Doe example, Vernon et al. in *Catalysis Letters*, 6, pp. 181–186, (1990), discloses that methane can be converted to synthesis gas over catalysts such as palladium, platinum, or ruthenium on alumina, nickel on alumina, and certain transition metal oxides including $Pr_2Ru_2O_7$ and $Eu_2Ir_2O_7$. Ashcroft et al. in *Nature*, 352, p. 225, (1991), describes steam reforming of methane with carbon dioxide to form synthesis gas using catalysts such as palladium, ruthenium and iridium on alumina, as well as nickel on alumina. U.S. Pat. No. 3,791,993 to Rostrup-Nielsen discloses the preparation of catalysts for reforming gaseous or vaporizable liquid hydrocarbons using steam, carbon oxide, oxygen and/or air. Examples in U.S. Pat. No. 3,791,993 show that compositions having nickel, magnesium and aluminum are suitable for converting naphtha to hydrogen-rich gaseous products using steam reforming. Each of these references is hereby incorporated by reference for their disclosure relating to reforming catalysts.

In a preferred embodiment, Applicants' invention is a process for separating oxygen from an oxygen-containing gaseous mixture, the process comprising:

(A) Providing a separation apparatus which comprises;
a vessel having at least first and second zones separated by an oxygen ion-conducting dense ceramic membrane comprising mixed metal oxide containing at least strontium, cobalt, iron, and oxygen having a powder X-ray diffraction pattern comprising significant lines substantially as described in Table I, the membrane having a first surface open to the first zone, a second surface open to the second zone,
the separation apparatus further comprising a first entrance manifold means in flow communication with the first zone and a first exit manifold means in flow communication with the first zone and thereby in flow communication with the first entrance manifold means and the first surface of the membrane, and a second entrance manifold means in flow communication with the second zone and a second exit manifold means in flow communication with the second zone and thereby in flow communication with second entrance manifold means and the second surface of the membrane;

(B) Controlling temperatures within the vessel to temperatures in a range from about 500° C. to about 1150° C.;

(C) Feeding the oxygen-containing gaseous mixture into the first zone;

(D) Establishing a positive oxygen partial pressure difference between the first and second zones by producing an excess oxygen partial pressure in the first zone and/or by producing a reduced oxygen partial pressure in the second zone;

(E) Contacting the oxygen-containing gaseous mixture in the first zone of the separation apparatus with the first surface of the membrane such that;
(i) oxygen is extracted from the oxygen-containing gaseous mixture at the first surface of the membrane to form an oxygen-depleted first product, and
(ii) the extracted oxygen is transported across the membrane, in the form of oxygen ions, to the second surface of the membrane; and (F) Recovering in the second zone transferred oxygen present on the second surface of the membrane, and expelling an oxygen-containing product from the second zone.

In a preferred aspect of the invention, the process for separating oxygen from an oxygen-containing gaseous mixture further comprises: (G) Feeding a gaseous mixture containing an organic compound or compounds into the second zone, reacting at least one of the compounds with the oxygen transferred into the zone to form oxidation products, and expelling a product-containing gas mixture.

In another preferred aspect of the invention, the process for separating oxygen from an oxygen-containing gaseous mixture further comprises: (G) Feeding a gaseous mixture containing at least one organic compound selected from the group consisting of methane, ethane, and other light hydrocarbon gases, into the second zone, reacting at least one of the compounds with the oxygen transferred into the zone to form oxidation products, and expelling a product-containing gas mixture.

In the latter process the reaction is, preferably, carried out at temperatures within the second zone in a temperature range from about 800° C. to about 1050° C. to form oxidation products comprising hydrogen and carbon monoxide, and the process further comprises: (E) recovering from the product of the second zone a synthesis gas comprising hydrogen and carbon monoxide.

In Applicants' process for recovering oxygen from a oxygen-containing gaseous mixture, any conventional vessel can be utilized to house the oxygen ion-conducting ceramic membranes of the present invention whereby the membrane forms a partition between a first zone and a second zone, or first and second gas compartments. Representative apparatus is disclosed in U.S. Pat. Nos. 5,035,727, and 5,160,713.

The oxygen permeable dense ceramic membrane provides a gas-tight partition between the first and second zones wherein the ceramic is impervious to other components of the oxygen-containing gaseous mixture at elevated temperatures suitable for permeation of oxygen. Dense ceramic membranes of the present invention comprise, preferably, mixed metal oxides containing at least strontium, cobalt, iron, and oxygen having a powder X-ray diffraction pattern comprising significant lines substantially as described in Table I. Preferred mixed metal oxides demonstrate both electron conductivity as well as oxygen ion-conductive and are referred to as mixed conductors.

When an oxygen-containing gaseous mixture having a suitably high partial pressure of oxygen, i.e., in a range upward from about 0.2 atm., is applied to one side of a dense ceramic membrane of this type (the first surface), oxygen will adsorb and dissociate on the surface, become ionized and diffuse through the ceramic to the other side (the second surface) and deionize, associate and desorb as separated oxygen into another gaseous mixture having a partial pressure of oxygen lower than that applied to the first surface. The necessary circuit of electrons to supply this ionization/deionization process is, advantageously, maintained internally in the oxide via its electronic conductivity.

Oxygen-containing gaseous mixtures suitable as feed streams to the present process typically contain between about 10 mole percent to 50 mole percent oxygen. Water, carbon dioxide, nitrogen and/or other gaseous components are typically present in feed mixtures. A preferred oxygen-containing gaseous mixture is atmospheric air. Volatile hydrocarbons which are converted to carbon dioxide and water under operating conditions of the process may be included in small amounts without causing adverse effect on the separation process. Representative of such hydrocarbons are linear and branched alkanes, alkenes and alkynes having from 1 to about 8 carbon atoms.

A difference in partial pressure of oxygen between the first and second zones, i.e., across the membrane, provides the driving force for separation of oxygen from an oxygen-containing gaseous mixture at process temperatures sufficient to cause oxygen in the first zone to adsorb, become ionized on the first surface and be transported through the ceramic membrane in ionic form toward the second surface of the ceramic membrane and the second zone where partial pressure of oxygen is lower than the first zone. Transported oxygen is collected and/or reacted in the second zone wherein ionic oxygen is converted into neutral form by release of electrons at the second surface.

An excess partial pressure of oxygen in the first zone over that in the second zone (positive oxygen partial pressure difference) can be created by compressing the gaseous mixture in the first zone to a pressure sufficient to recover transported oxygen, i.e., an oxygen permeate stream, at a pressure of greater than or equal to about one atmosphere. Typical feed pressures are in a range of from about 15 psia to abut 250 psia, depending largely upon the amount of oxygen in the feed mixture. Conventional compressors can be utilized to achieve the compression required to practice the present process.

Alternatively, a positive oxygen partial pressure difference between the first and second zones can be achieved by reaction of transported oxygen with an oxygen-consuming substance, such as a volatile organic compound, to form value added oxygen-containing products and/or by mechanically evacuation of the second zone to a pressure sufficient to recover transported oxygen. Advantageously, a gaseous mixture containing organic compounds such as methane, ethane, and other light hydrocarbon gases, is fed into the second zone wherein at least one of the compounds reacts with the oxygen transferred into the zone to form value added oxidation products.

One method for employing the membrane of this invention is in a chemical reactor cell for reacting, for example, oxygen from an oxygen-containing gas stream with organic compounds in another gas stream. A reactor cell comprises a first gas stream defining a direction of steam flow containing either the oxygen-containing gas or the organic compounds and positioned therein a ceramic core having an outer surface including a generally flat entrance surface and a generally flat exit surface spaced apart from and substantially parallel to the entrance surface, and at least one core channel therebetween for flow of one or more gases from the entrance surface to the exit surface and defining a direction of channel flow. The direction of channel flow is non parallel to the direction of stream flow. Preferably the direction of stream flow and the direction of channel flow are transverse to one another. Each channel has at least one channel wall disposed between the channel and a portion of the outer surface of the ceramic core comprising mixed metal oxide containing at least strontium, cobalt, iron, and oxygen having a powder X-ray diffraction pattern comprising significant lines substantially as described in Table I.

Figure 2:
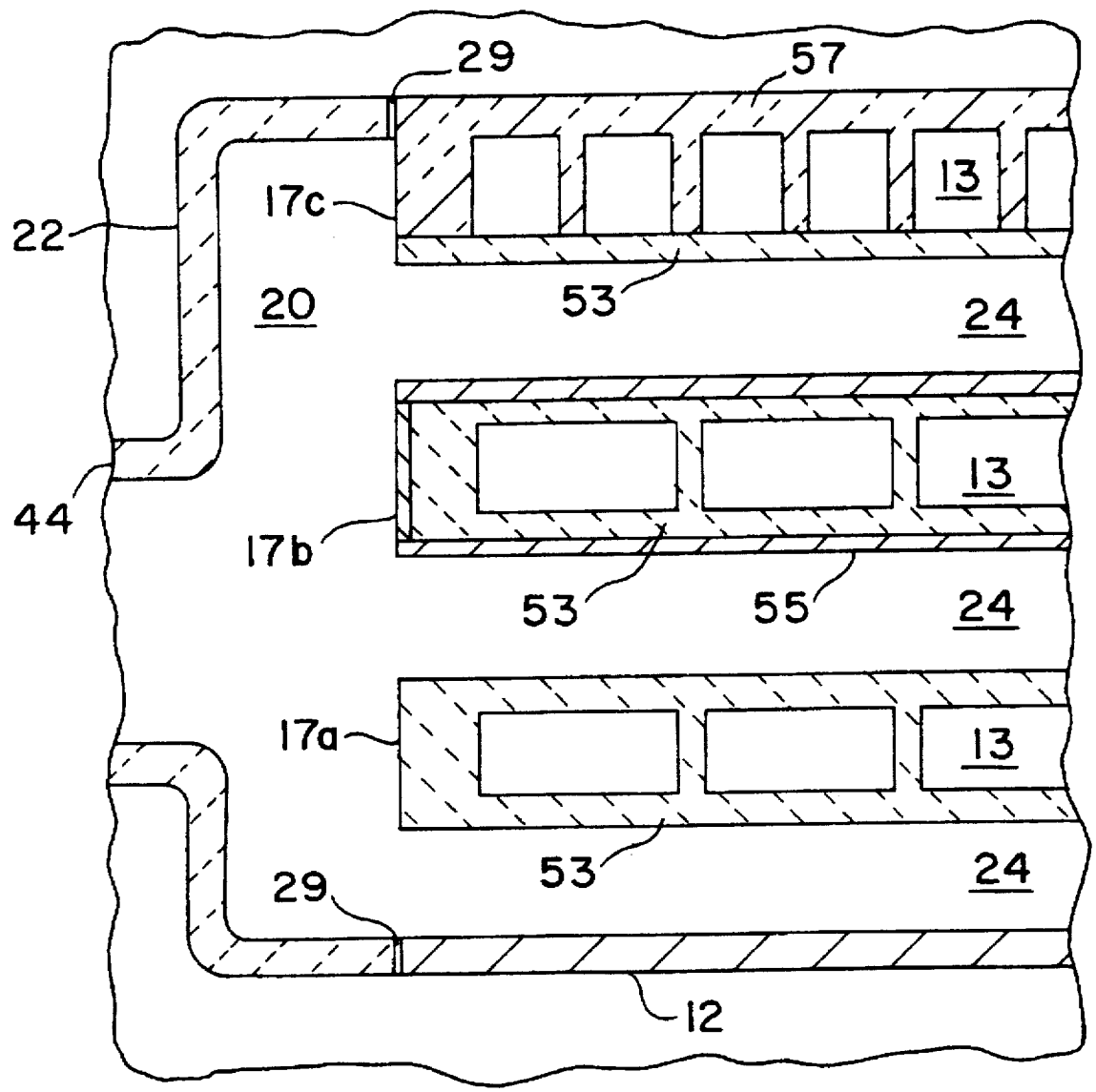
FIG. 2 is a sectional view of the cross-flow reactor of FIG. 1.

FIGS. 1 and 2 illustrate a cross-flow reactor 10 having an array of reactor cells 11. Three reactor cell cores 17 are positioned across passageways for flow of a gas steam 24. Each reactor cell core 17 has opposite top and bottom outer surfaces which are generally flat and approximately 90° form an entrance surface and an opposite side exit surface spaced apart from and substantially parallel with each other. The array of reactor cells together is approximately a rectangular parallelepiped shape. Reactor cell cores 17 have a plurality of core channels 13 between their entrance surfaces and exit surfaces 19 for flow of gases from each entrance surface to the corresponding opposite exit surface and defining a direction of channel flow which is rotated approximately 90° form the entrance and exit surfaces and is approximately 90° form the direction of stream flow along the top and/or bottom outer surface of each core. Structures 15 and 21 adjacent opposite entrance and exit surfaces of reactor cell cores 17 define spaced entrance and exit manifolds (not shown) that communicate with one another via channels 13 formed in the cores. Further, structures 22 and 26 adjacent opposite edge surfaces of reactor cell cores 17 define spaced entrance manifold 20 and opposite exit manifold (not shown) that communicate with one another via passageways 24 formed by spaces between outer surfaces of the reactor cell cores and bottom structure 12. An inlet line 33 in structure 15 is adapted to carry either an oxygen-containing gas stream or another gas stream containing reactants comprising one or more organic compounds to the entrance manifold for flow through channels 13, and an outlet line 35 in structure 21 is adapted to carry a residue of the oxygen-containing gas stream or all remaining gas, unconsumed reactants, and product-containing gas mixture from the exit manifold. Likewise, inlet line 44 in structure 22 is adapted to carry either an oxygen-containing gas stream or another gas stream containing reactants comprising one or more organic compounds to the entrance manifold for flow through passageways 24, and an outlet line 46 in structure 26 is adapted to carry a residue of the oxygen-containing gas stream or all remaining gas, unconsumed reactants, and product-containing gas mixture from the exit manifold. Passageways 24 and channels 13 are disposed transverse to one another, so that the respective inlet and outlet manifolds for oxygen-containing gas stream and for the another gas stream containing reactants are located alternately adjacent one another.

FIG. 2 illustrates an enlarged cross section of the array of reactor cells 11 for cross-flow reactor 10 of FIG. 1. Specifically, passageways 24 for flow a one gas stream are illustrated to extend in the plane of the viewing paper and are formed by spaces between outer surfaces of the reactor cell cores and bottom structure 12 defining the exposed walls of the passageways 24; while the channels 13 for the other gas stream are illustrated to extend normal to the viewing paper and are formed in an oxygen permeable material 53 which has both electron conductivity and oxygen ion conductivity defining the exposed walls of the channels 23.

For economy of illustration different embodiments of reactor cell cores 17 are shown in FIG. 2. Core structure 17a has channels 13 formed with a rectangular cross-section in an oxygen permeable material 53 which has both electron conductivity and oxygen ion conductivity. In core structure 17b oxygen permeable material 53 is enclosed in a layer of gas permeable catalyst 55. Core structure 17c has channels 13 formed by an inert gas impermeable support 57 and a wall of an oxygen permeable material 53 which has both electron conductivity and oxygen ion conductivity. The array of reactor cells 11, bottom structure 12, and manifold structures 15, 21, 22, and 26 are snugged or otherwise connected together and may be fit within a housing (not shown) and/or have insulation surrounding these components. Also, the annular space between the top core, bottom structure, and separate manifold structures can be packed or filled as at 29 with a ceramic paste or the like seal to minimize leakage of gases between the manifolds.

In another aspect, the invention is a reactor cell for reacting, for example, oxygen from an oxygen-containing gas stream with organic compounds in another gas stream, comprising a ceramic core having a generally flat first entrance surface, a generally flat first exit surface spaced apart from and substantially parallel to the first entrance surface, and a first plurality of core channels therebetween for flow of an oxygen-containing gas stream from the first entrance surface to the first exit surface operable to define a first direction of channel flow, and having a generally flat second entrance surface, a generally flat second exit surface spaced apart from and substantially parallel to the second entrance surface, and a plurality of core channels therebetween for flow of the other gas stream containing a least one organic compound from the second entrance surface to the second exit surface operable to define a second direction of channel flow which direction is non parallel to the first direction of channel flow. Preferably the first direction of channel flow and the second direction of channel flow are transverse to one another. Each channel has a portion of channel wall disposed between the oxygen-containing gas stream and the another gas stream comprising mixed metal oxide containing at least strontium, cobalt, iron, and oxygen having a powder X-ray diffraction pattern comprising significant lines substantially as described in Table I. Preferably each channel of the first plurality of core channels comprises at least one wall which is generally planar and disposed parallel to the first direction of channel flow and each channel of the second plurality of core channels comprises at least one wall which is generally planar and disposed parallel to the second direction of channel flow, and wherein the first plurality of core channels and the second plurality of core channels are disposed transverse to one another.

Figure 3:
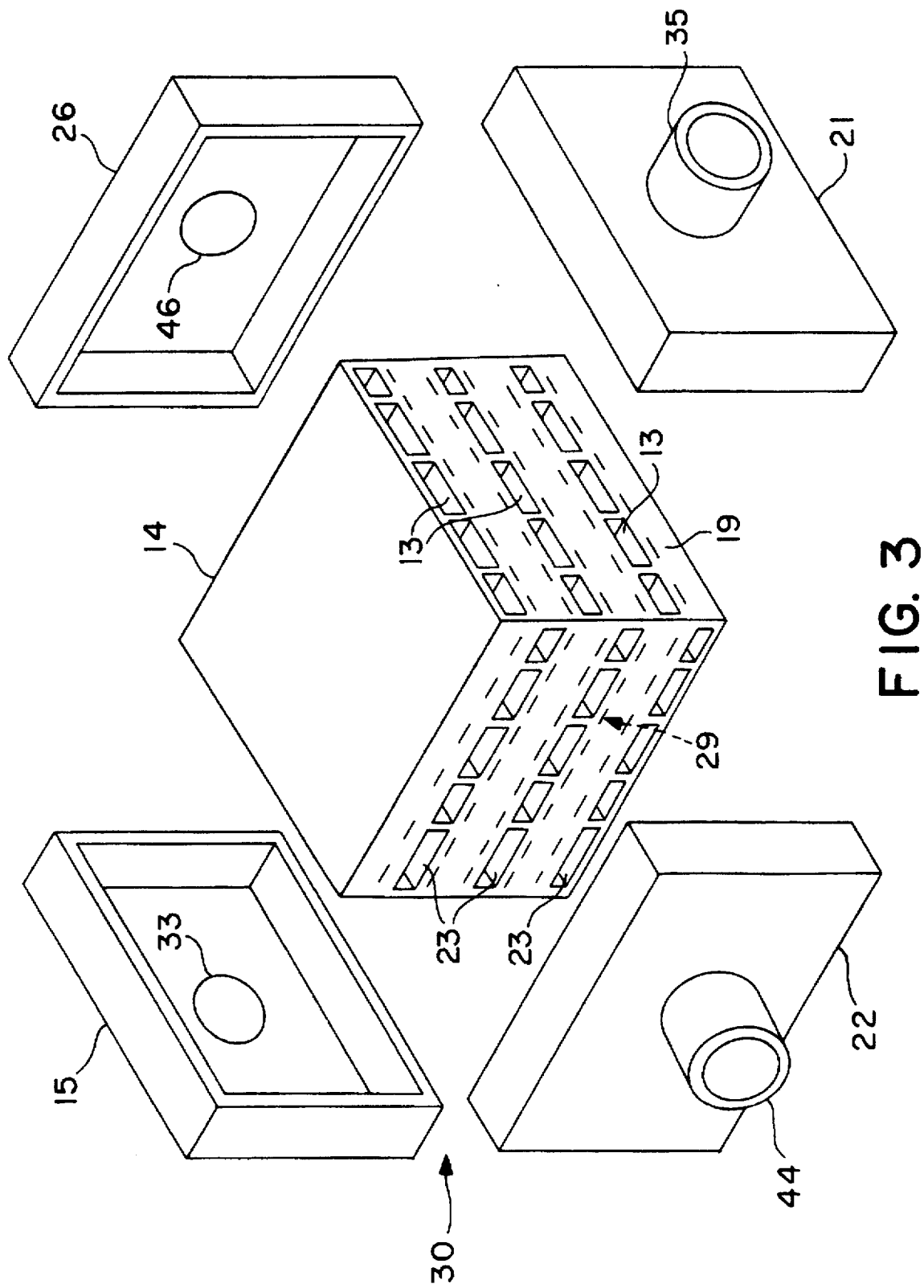
FIG. 3 is an exploded perspective view of another embodiment of a cross-flow reactor in accordance with the present invention.

FIG. 3 illustrates a cross-flow reactor 30 having a core of reactor cells 14 of monolithic construction. The monolithic core of reactor cells is approximately a rectangular parallelepiped shape having two sets of entrance and opposite side exit surfaces, each set spaced apart from and substantially parallel with each other, and top and bottom outer surfaces which are generally flat and approximately 90° form the entrance and exit surfaces. Structures 15 and 21 adjacent opposite entrance surface (not shown) and exit surface 19 of reactor cell core define spaced entrance and exit manifolds (not shown) that communicate with one another via channels 13 formed in the core. Further, structures 22 and 26 adjacent opposite entrance surface 29 and exit surface (not shown) of reactor cell core define spaced entrance and exit manifolds (not shown) that communicate with one another via channels 23 formed in the core. An inlet line 33 in structure 15 is adapted to carry either an oxygen-containing gas stream or another gas stream containing reactants comprising one or more organic compounds to the entrance manifold for flow through channels 13, and an outlet line 35 in structure 21 is adapted to carry a residue of the oxygen-containing gas stream or all remaining gas, unconsumed reactants, and product-containing gas mixture from the exit manifold. Likewise, inlet line 44 in structure 22 is adapted to carry either an oxygen-containing gas stream or another gas stream containing reactants comprising one or more organic manifolds to the entrance manifold for flow through channels 23, and an outlet line 46 in structure 26 is adapted to carry a residue of the oxygen-containing gas stream or all remaining gas, unconsumed reactants, and product-containing gas mixture from the exit manifold. Channels 13 and channels 23 are disposed transverse to one another, so that the respective inlet and outlet manifolds for oxygen-containing gas stream and for the another gas stream containing reactants are located alternately adjacent one another. The core of reactor cells 14 and manifold structures 15, 21, 22, and 26 are snugged or otherwise connected together and may be fit within a housing (not shown) and/or have insulation surrounding these components. Also, the annular space between the top core, bottom structure, and separate manifold structures can be packed or filled with a ceramic paste or the like seal to minimize leakage of gases between the manifolds.

Figure 4:
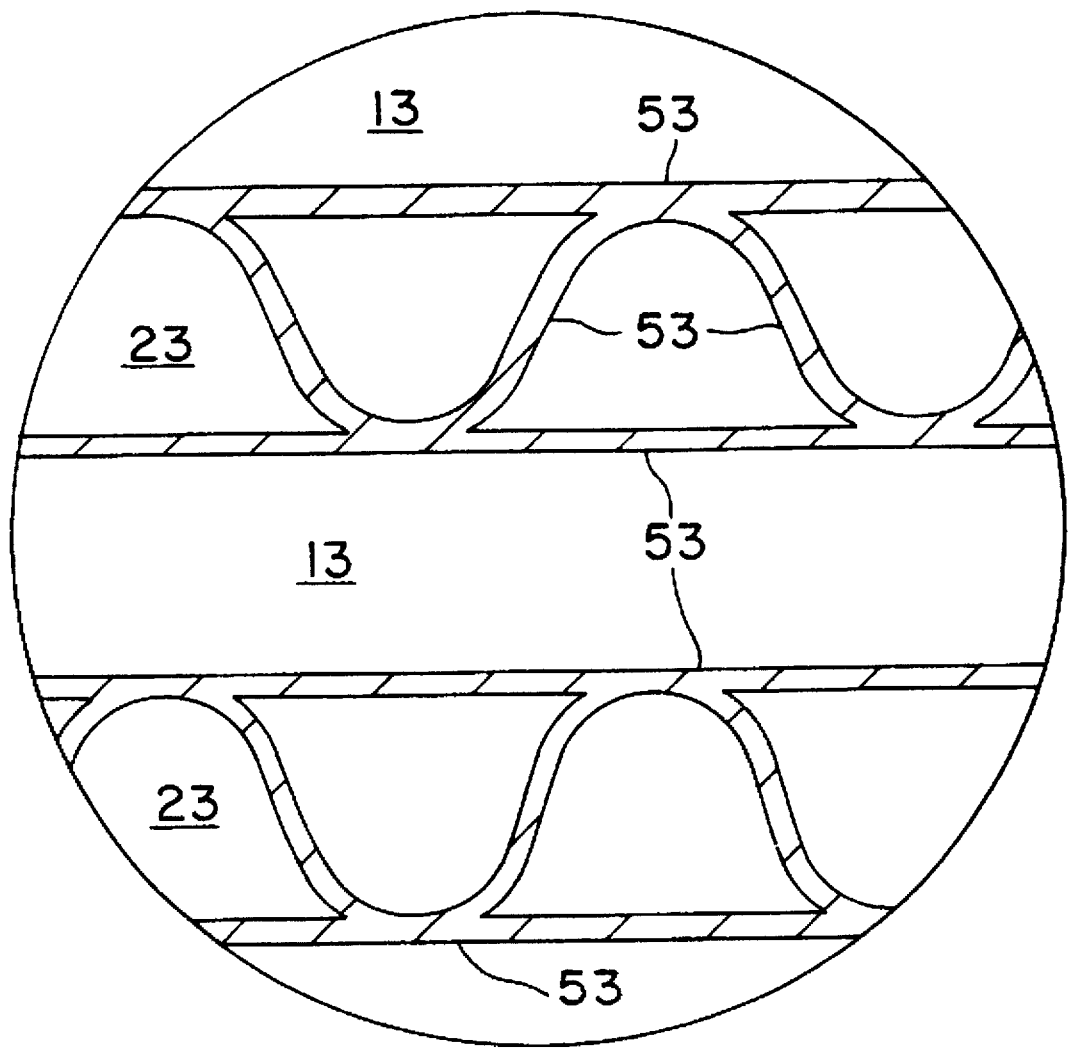
FIG. 4 is a sectional view of a cross-flow core in accordance with the present invention.

FIG. 4 illustrates an enlarged cross section of the core of reactor cells 14 for cross-flow reactor 30 of FIG. 3. Specifically, channels 13 for flow a one gas stream are illustrated to extend in the plane of the viewing paper and are formed in an oxygen permeable material 53 which has both electron conductivity and oxygen ion conductivity defining the exposed walls of the channels 13; while the channels 23 for the other gas stream are illustrated to extend normal to the viewing paper and are formed in an oxygen permeable material 53 which has both electron conductivity and oxygen ion conductivity defining the exposed walls of the channels 23.

In contrast to conventional fuel cells, cross-flow reactors according to this invention are free of means for completion of an external electric circuit.

It will be appreciated that in cross-flow reactor 10 having an array of reactor cells 11, the passageways 24 and channels 13 are laid out in a crosswise pattern so that the two gas streams flow transverse to one another, and in cross-flow reactor 30 having a monolithic core of reactor cells 11, the channels 23 and channels 13 are laid out in a crosswise pattern so that the two gas streams flow transverse to one another. These cross flow arrangements allow for direct and efficient manifolding of the opposite open ends of the flow channels and/or passageways, and the manifolds can be extended over almost the entire opposite entrance and exit surfaces or edges of the cores.

Mixed metal oxide compositions of present invention have, typically, a crystalline structure comprising relatively dense atomic layers held apart by less dense bridging layers. Advantageously, the crystalline structure comprise layers of a perovskite-type held apart by bridging layers of a different type such that the crystalline structure is identifiable by means of a powder X-ray diffraction pattern.

It is important to recognize that there are fundamental and unpredictably differences between the perovskite-type materials described in the prior art and the novel crystalline mixed metal oxide compositions according to the present invention. In one aspect, for example, the present compositions have a characteristic crystal structure which is remarkably different from known perovskite-type materials as has been determined by structural analysis using X-ray radiation. In the $ABO_3$, perovskite-type crystal, there are only two metal ion positions; A metal ions occupy corner positions of a cube (which is often slightly distorted) and B metal ions occupy the body-center of the cube, and oxygen ions are at the centers of each cube face. The crystal structure of mixed metal oxide compositions according to the present invention is more complex than the well known perovskite-type crystal, as is illustrated, for example, in FIG. 5. The whole crystal structure of the present material is not a perovskite-type because the positions occupied by metal ions include arrays which can not be identified as perovskite-type layers even though they are between arrays identified as perovskite-type layers for the purpose of describing the present invention.

Several aspects of the present invention are directed to mixed metal oxides containing at least strontium, cobalt, iron, and oxygen, having a powder X-ray diffraction pattern comprising significant lines substantially as described in Table I. Such oxides according to the present invention are believed to have crystalline structure related by cobalt ion substitution for iron ions in a structure defined by $Sr_4Fe_6O_{13}$.

Figure 12B:
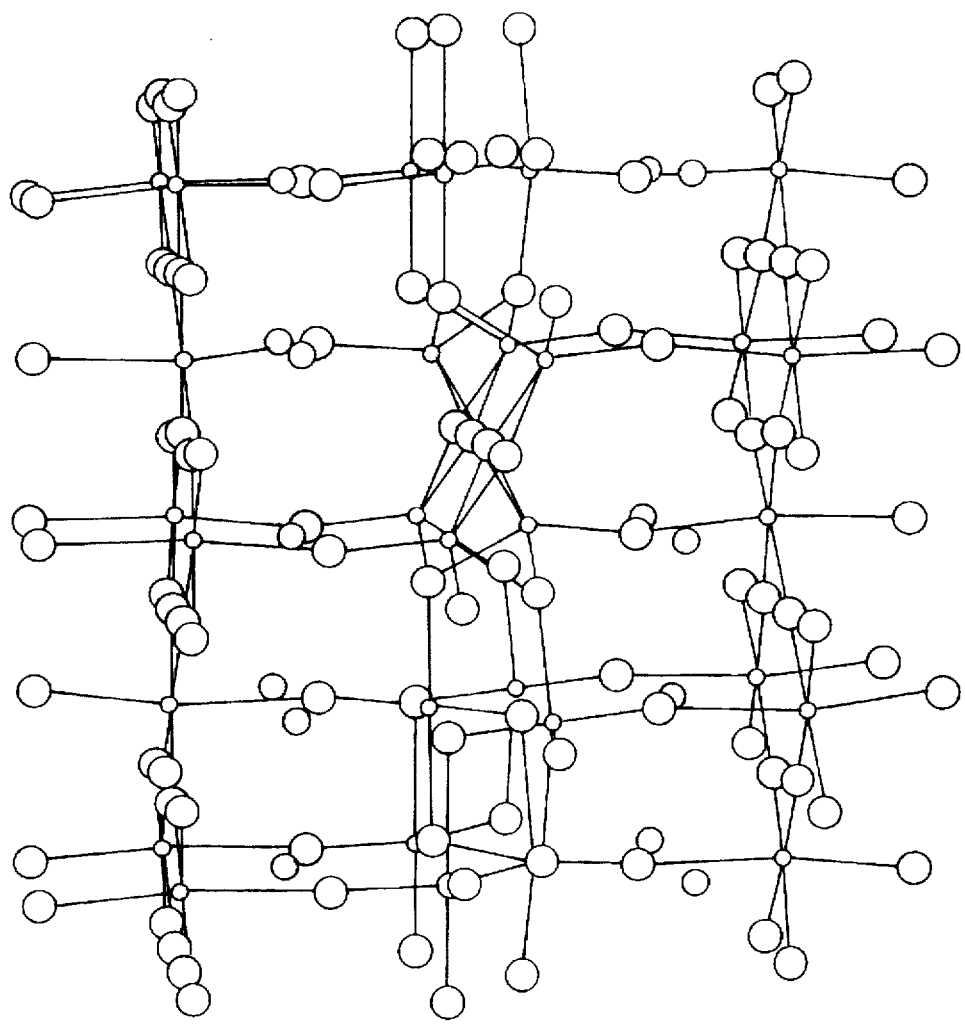
FIG. 12 shows computer-generated perspective views depicting, (a) the arrangement of ions in known $ABO_3$ perovskite structure; and (b) an integral crystalline structure comprises layers having a perovskite structure held apart by bridging layers having a different structure in accordance with the present invention.
Figure 12A:
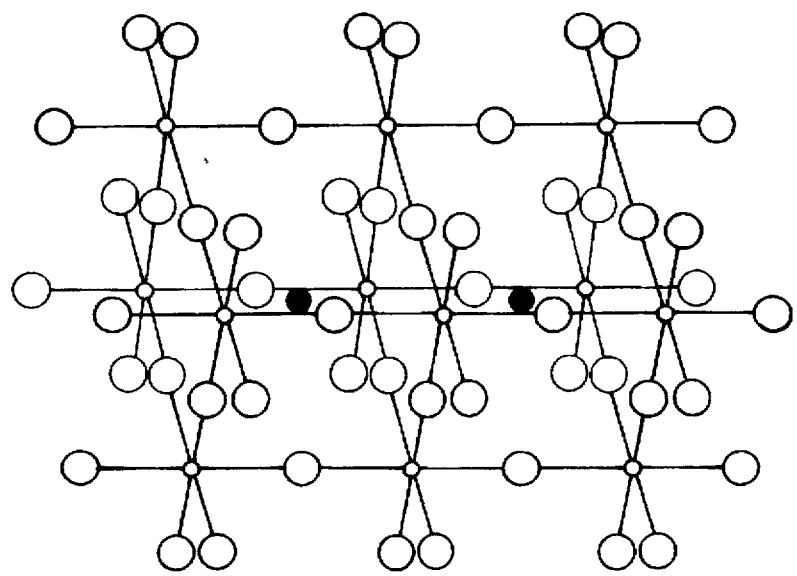

FIG. 12 shows computer-generated perspective views of two different idealized crystalline structures. FIG. 12(a) illustrates the arrangement of ions in the known $ABO_3$ perovskite cubic lattice in which each unit cell contains a metal ion A, represented by small black balls, at the center of the unit cell, a different a metal ion B, represented by small white balls, at the corners of the unit cell, and oxygen ions, represented by large white balls, at the midpoint of each cube edge. In FIG. 12(a) two unit cells of the cubic perovskite lattice are shown stacked together vertically. In contrast, FIG. 12(b) illustrates the unexpected arrangement of ions in an integral crystalline structure comprising layers having a perovskite structure held apart by bridging layers having a different structure in accordance with the present invention. In FIG. 12(b) the novel lattice of the integral crystalline structure is depicted as having a middle layer between upper and lower layers. Iron and cobalt ions are represented by small white balls, and oxygen ions are represented by large white balls. Strontium ions, represented by small black balls in the upper and lower layers, are at the center of unit cells which resemble the perovskite cubic lattice of unit cells which repeat horizontally, but not in vertically. In the interrupting middle layer which holds apart the upper and lower layers, the arrangement of ions is not the known perovskite cubic lattice. While the middle layer of ions interrupts the heretofore expected repetition of the cubic lattice, this different arrangement of ions bridges the upper and lower layers to form an integral crystalline structure in accordance with the present invention.

Figure 5:
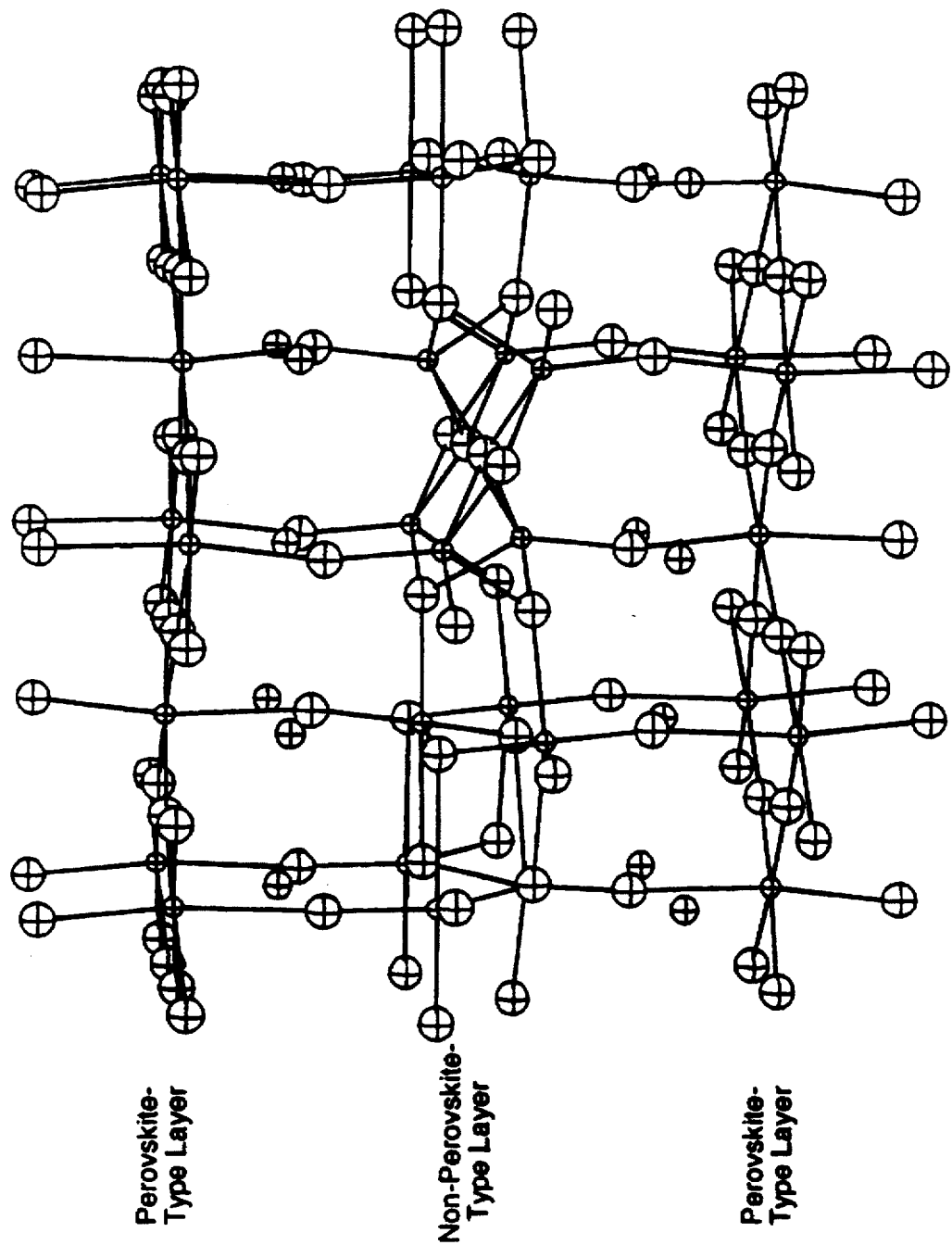
FIG. 5 is a computer-generated perspective view showing the arrangement of ions in crystalline $Sr_4$ $(Fe_{1-x}Co_x)_6O_8$.

FIG. 5 illustrates the arrangement of ions in crystalline $Sr_4Fe_6O_{13}$ by reproduction of a computer-generated perspective view where oxygen ions are represented by large balls with sticks, iron ions are represented by small balls with sticks, and strontium ions are represented by small balls without sticks. In this view there are two relatively dense layers, identified as Perovskite-Type Layers, but these are held apart by iron oxide "bridges" and "Walls," identified as a Non-Perovskite-Type Layer. It is noted that paralleling the dense, perovskite-like layers, there are columns of oxygen ions. These columns of oxygen ions extend all the way through the crystal.

Figure 6:
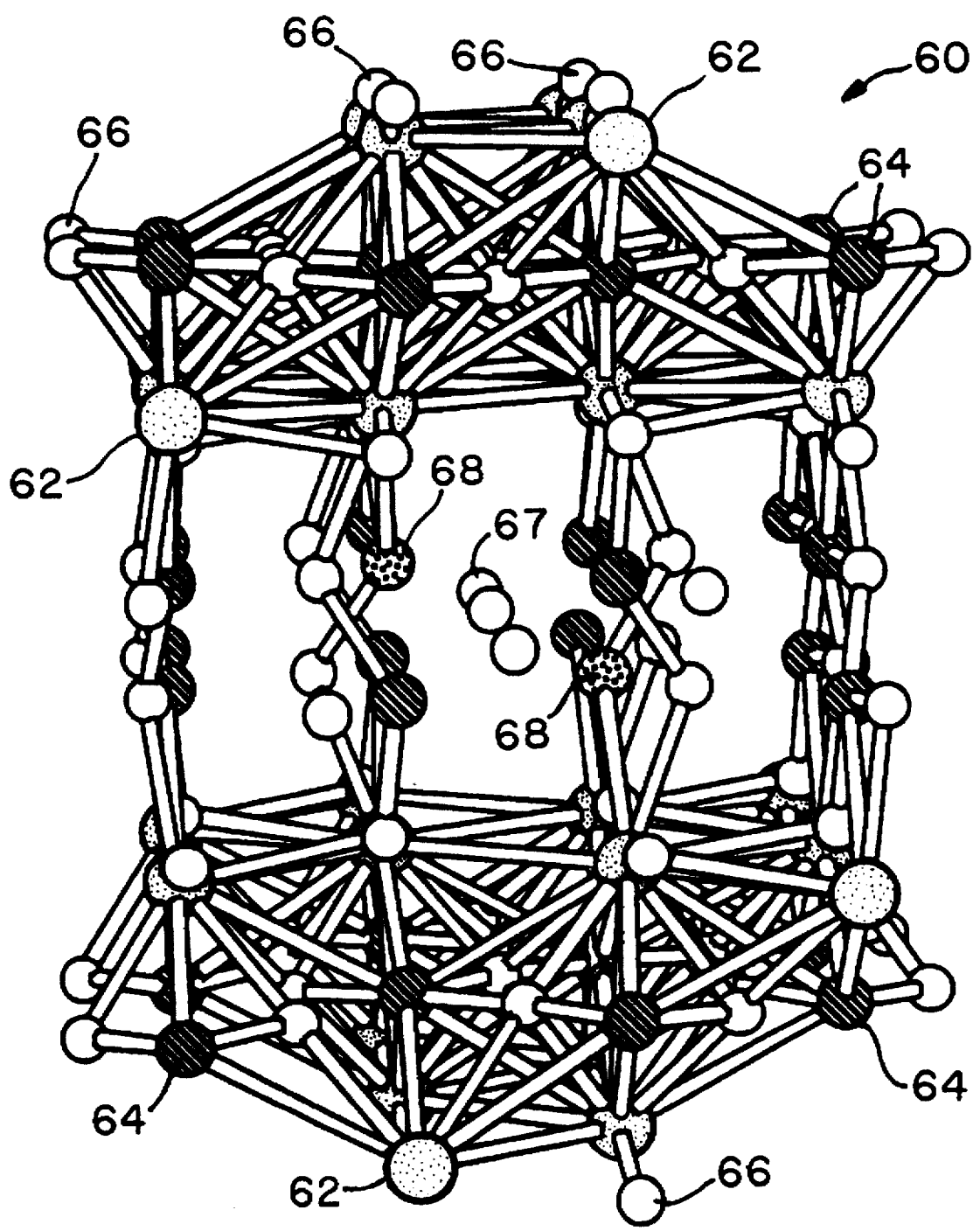
FIG. 6 is a computer-generated perspective view showing the arrangement of ions in crystalline $Sr_4$ $(Fe_{1-x}Co_x)_6O_8$.

FIG. 6 illustrates a likely arrangement of ions in crystalline mixed oxides of the present invention containing strontium, cobalt, iron, and oxygen. The computer-generated perspective view 60 was defined by the structure of $Sr_4Fe_6O_{13}$ wherein two iron atoms have been replaced by two cobalt atoms 68, represented by large speckled circles, in the cage around a column of oxygen atoms 67. In this visualization of the likely structure strontium atoms 62 are represented by large gray circles, iron atoms 64 are represented by large striped circles, and oxygen ions 66 are represented by small open circles. In this view the column of oxygen atoms 67 is represented by three small open circles which is one less than the four shown in the structure of $Sr_4Fe_6O_{13}$ with none of the iron atoms replaced by cobalt atoms.

These columns of oxygen ions extend all the way through the crystal and could form a "virtual channel." It is believed that, shifting the entire column by one lattice position would have the effect of transporting an oxygen from one end of the crystal to the other. Since these oxygens are in the form of oxygen ions, however, atmospheric oxygen could add to one end of the column at a first side of a membrane and leave the other end of the column at a second side of a membrane only by an oxidation/reduction cycle. This mechanism would be expected to selectively transport oxygen, but not other molecules (such as nitrogen). This belief is based on a quantum mechanical calculation of the kinetic barrier to movement of oxygen was through the "virtual channel," and on consideration of the oxidation/reduction potential available.

Another observation relevant to the permeation of oxygen is apparent. This structure has no open channel large enough for diatomic oxygen, $O_2$, or diatomic nitrogen, $N_2$, to pass through. This could be made even clearer with a space filling visualization in which atoms are shown at their full, ionic radii. There is, therefore, no unoccupied volume in the structure large enough for a nitrogen molecule to fit into, let alone to pass through. Hence, this ceramic cannot be permeable to molecular nitrogen or oxygen in the traditional way.

Figure 7:
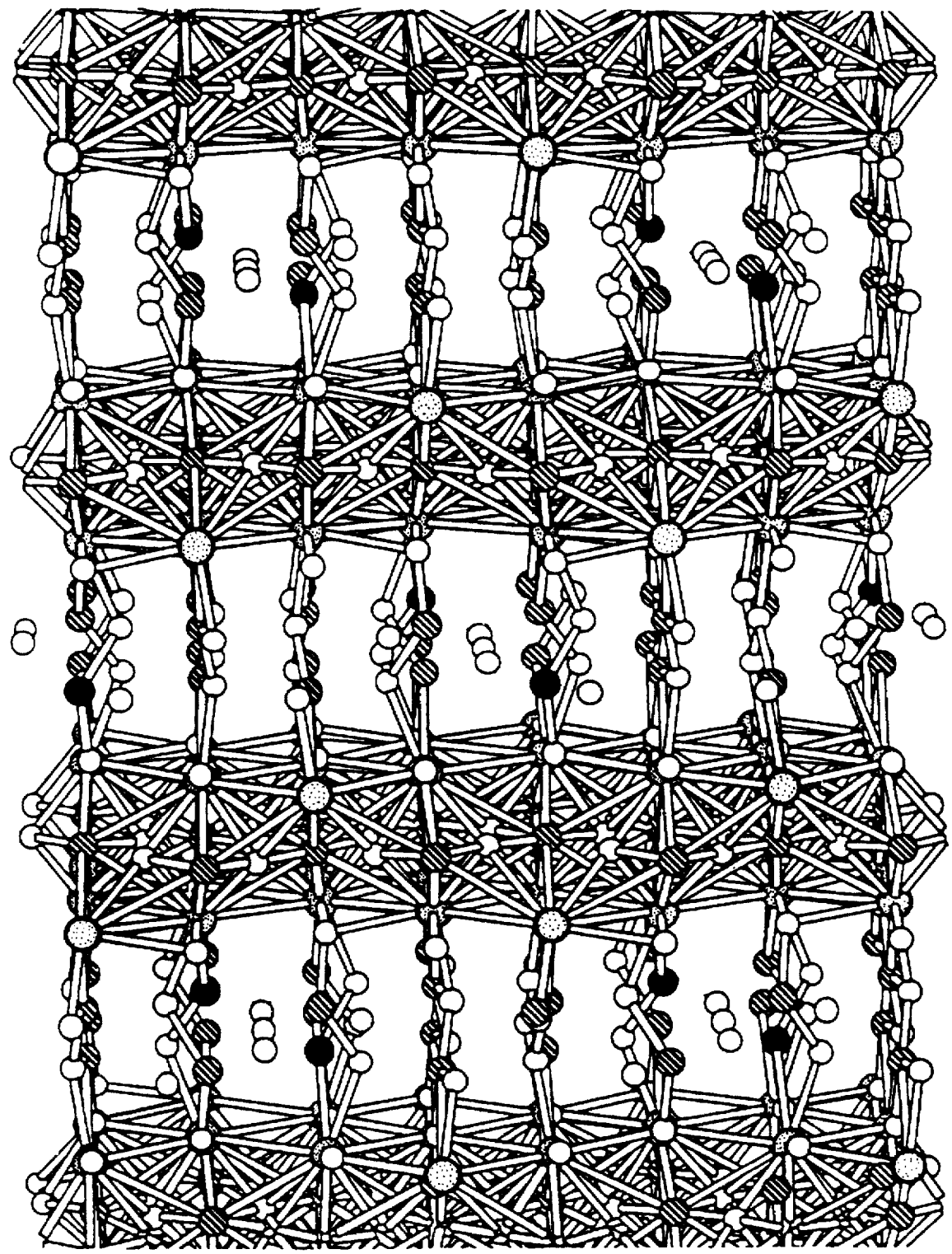
FIG. 7 is a computer-generated perspective view showing the structure of crystalline mixed metal oxide containing strontium, cobalt, iron, and oxygen.

FIG. 7 illustrates a likely arrangement of ions in crystalline mixed oxides of the present invention containing strontium, cobalt, iron, and oxygen. Again the computer-generated perspective view was defined by the structure of $Sr_4Fe_6O_{13}$ wherein two iron atoms have been replaced by two cobalt atoms, represented by large black circles, in the cage around a column of oxygen atoms. In this visualization of the likely structure strontium atoms are represented by large gray circles, iron atoms are represented by large striped circles, and oxygen ions are represented by small open circles. In this view there are two Perovskite-Type Layers held apart by iron oxide "bridges" and "Walls," which are identified as Non-Perovskite-Type Layers. It is noted that paralleling the perovskite-like layers there are columns of oxygen ions. These columns of oxygen ions extend all the way through the crystal.

Although the whole crystal structure of the present materials depicted in FIGS. 6 and 7 is described as containing some perovskite-type building units, from study of their crystallography and other physical properties, such as significant improvement in mechanical integrity, they have been shown to be different and more structurally complex than known perovskite materials.

It is important to understand that the present material is not a trivial mechanical mixture of a perovskite material and a non-perovskite partner. In these layered crystalline structures, it is believed, different atomic arrays are stacked in a coherent and periodic fashion which has lead to desired new properties. In such layered crystalline structures, different atomic arrays are matched to each other in particular arrangement so as to have proper bond distances between all atoms in the whole structure. Otherwise a mechanical mixture of multiply materials only would have been obtained. There is, apparently, no scientific method to predict whether, or by what method, a new crystalline structure can be formed in which any two different, known or prophetic, atomic arrays are brought together to form a proposed layered crystal structure. Discovery of new crystalline structure is still an art which, more often than not, requires extensive trial-and-error experimentation.

Mixed metal oxides useful in dense ceramic membranes of this invention include any single phase and/or multi-phase, dense phase, intimate mixture of materials which together form a solid material having electron conductivity and oxygen ion conductivity. As used herein, the term "gas-impervious" means "substantially gas-impervious or gas-tight" in that the material does not permit a substantial amount of oxygen-containing gas stream or another, organic-containing, gas stream to pass through the solid mixed metal oxide materials of the ceramic cores as a gas (i.e., the solid mixed metal oxide materials are non-porous, rather than porous, with respect to the relevant gases). A minor degree of porosity to gases might, in some systems, be unavoidable and/or acceptable, such as when hydrogen gas is present.

In particular, it has been found that mixed metal oxides according to this invention (at operating temperatures) can have useful levels of oxygen ion conductivity.

Materials and methods useful in dense ceramic membrane preparation are described in U. Balachandran et al., "Fabrication of Ceramic-Membrane Tubes for Direct Conversion of Natural Gas", submitted for publication in the Proceedings of the 1992 International Gas Research Conference (IGRC92), Orlando, Fla., (Nov. 16–19, 1992); Y. Takeda et al., Z. Anorg. Allg. Chem., 550/541, 259 (1986); Y. Teraoka et al., Chem. Lett., 19, 1743 (1985); P. D. Battle et al., J. Solid State Chem., 76, 334 (1988); M. Harder and H. H. Muller-Buschbaum, Z. Anorg. Allg. Chem., 464, 169 (1980); C. Greaves et al., Acta Cryst., B31, 641 (1975). Each of these publications is hereby incorporated herein by reference for its disclosure relating to preparation of dense ceramic membranes.

As mentioned above, the mixed metal oxide materials useful in dense ceramic membranes of this invention include any single phase and/or multi-phase, dense phase, intimate mixture of materials which has electron conductivity and oxygen ion conductivity. In relation to the solid metal oxide materials, the terms "mixture" and "mixtures" include materials comprised of two or more solid phases, and single-phase materials in which atoms of the included elements are intermingled in the same solid phase, such as in the yttria-stabilized zirconia. The term "multiphase" refers to a material which contains two or more solid phases interspersed without forming a single phase solution. Useful core material, therefore, includes the multi-phase mixture which is "multi-phase" because the electronically-conductive material and the oxygen ion-conductive material are present as at least two solid phases, such that atoms of the various components of the multi-component solid are, primarily, not intermingled in the same solid phase.

Useful multi-phase solid core materials are described in European Patent Application number; 90305684.4, published on Nov. 28, 1990, under Publication No. EP 0 399 833 A1 the disclosure of which is hereby incorporated herein by reference.

In the indirect method for making a dense ceramic membranes containing a mixed metal oxide material having crystalline structure according to the invention, a solid oxide is made and commuted to a powder, the powder is blended into a plastic mass with solvent liquid and optionally additives, a desired shape formed from the plastic mass, and the shape heated to temperatures sufficient to form a dense and solid ceramic having electron conductivity and oxygen ion conductivity. Typically, such ceramics are obtained at temperatures in a range upward from about 500° C., and generally at temperatures in a range upward from about 800° C.

The mixed metal oxide of dense ceramic membranes in ceramic cores and/or reactor cells according to this invention may, advantageously, comprises an inert support. An inert support may be any material which achieves the desired objective as long as it does not interfere with reaction processes under reaction conditions. For example, a wall of gas-impervious mixed metal oxide material of a desired structure may be s supported on a porous or gas-impervious solid having a comb-like cross section. In another example, gas-impervious mixed metal oxide material of a desired structure may be deposited on a solid material which is porous to reactant and/or product gases and which functions as a support for the perovskite containing material. Any of a large number of oxides, including yttria-stabilized zirconia, doped ceria, thoria-based materials, or doped bismuth oxides, also useful as oxygen-conducting materials, and various other metal oxides may be used. Examples include CaO-stabilized $ZrO_2$; $Y_2O_3$-stabilized $ZrO_2$; $Sc_2O_3$-stabilized $ZrO_2$; $Y_2O_3$-stabilized $Bi_2O_3$; $Y_2O_3$-stabilized $CeO_2$; CaO-stabilized $CeO_2$; $ThO_2$; $Y_2O_3$-stabilized $ThO_2$; $ThO_2$, $ZrO_2$, $Bi_2O_3$, $CeO_2$ or $HfO_2$ stabilized by the addition of any one of the lanthanide oxides or $CaO;Al_2O_3$; etc.

Catalyst and/or mixed metal oxide material of this invention may be deposited on a solid in chemical reactor cells according to this invention by any known technique, including vapor deposition and/or electrolyses plating onto a porous substrate, impregnation of a porous substrate, co-impregnation of a porous substrate. Useful techniques may include heat treating a formed precursor to form a stable structure, or until it is gastight, then attaching the resulting solid to a support structure and further heat treating to achieve a finished ceramic core. Particularly useful for loading catalyst into core channels according to this invention are techniques analogous to techniques used to prepare molecular sieve columns for gas chromatograph. Other techniques may also be useful so long as the supporting substrate permits oxygen-containing gas and hydrocarbyl-containing gas to contact the gas-impervious mixed metal oxide material.

In practice, oxidation processes according to the present invention may be conducted in any cross-flow reactor using cross-flow reactor cells having oxygen permeable monolithic cores to control and facilitate transport of oxygen from an oxygen-containing gas stream to oxidation reactions of organic compounds in another gas stream.

Oxygen-containing gas steams which flow across the first surface of dense ceramic membranes in gas separation apparatus of this invention can be air, pure oxygen, or any other gas containing at least about 1 mol percent free oxygen. In another embodiment, the oxygen-containing gas stream contains oxygen in other forms such as $N_2O$, NO, $SO_2$, $SO_3$, steam, $CO_2$, etc. Preferably, the oxygen-containing gas steam contains at least about 1 mol percent free oxygen and more preferably the oxygen-containing gas steam is air.

As mentioned above, processes according to the present invention include processes for preparing synthesis gas by reacting oxygen from an oxygen-containing gas stream with a hydrocarbyl compound in another gas stream without contaminating the hydrocarbyl compound and/or products of oxidation with other gases from the oxygen-containing gas stream, such nitrogen from an air stream. Synthesis gas, a mixture of carbon monoxide (CO) and molecular hydrogen ($H_2$), is a valuable industrial feedstock for the manufacture of a variety of useful chemicals. For example, synthesis gas can be used to prepare methanol or acetic acid. Synthesis gas can also be used to prepare higher molecular weight alcohols or aldehydes as well as higher molecular weight hydrocarbons. Synthesis gas produced by the partial oxidation of methane, for example, is an exothermic reaction and produces synthesis gas having a useful ratio of hydrogen to carbon monoxide, according to the following equation:

$$CH_4 + \tfrac{1}{2}O_2 \rightarrow 2H_2 + CO$$

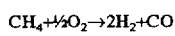

Preferred embodiments include processes for preparing synthesis gas by partial oxidation of any vaporizable hydrocarbyl compound. Hydrocarbyl compound used in processes of this invention suitably comprises one or more gaseous or vaporizable compounds that can be reacted with molecular oxygen or carbon dioxide to form synthesis gas. Most suitably, the hydrocarbyl compound is a hydrocarbon such as methane and/or ethane, however, various amounts of oxygen or other atoms can also be in the hydrocarbyl molecule. For example, hydrocarbyl compounds that can be converted to synthesis gas include methanol, dimethyl ether, ethylene oxide, and the like. However, the most preferable hydrocarbyl compounds are the low molecular weight hydrocarbons containing about 1 to about 20 carbons, more preferably 1 to about 10 carbon atoms. Methane, natural gas, which is mainly methane, or other light hydrocarbon mixtures which are readily available, inexpensive, are particularly preferred hydrocarbyl feed materials for processes of this invention. The natural gas can be either wellhead natural gas or processed natural gas. Composition of processed natural gas varies with the needs of the ultimate user. A typical processed natural gas composition contains about 70 percent by weight of methane, about 10 percent by weight of ethane, 10 percent to 15 percent of $CO_2$, and the balance is made up of smaller amounts of propane, butane and nitrogen. Mixtures of hydrocarbyl and/or hydrocarbon compounds can also be used.

Light hydrocarbon gas streams can be mixed with any inert diluent such as nitrogen, helium, neon, argon, krypton, xenon, or other gas, including steam, which does not interfere with the desired reaction. Nitrogen and steam are diluents of choice.

Typically for a process in which synthesis gas is made from methane, ethane, and other light hydrocarbon gases in the presence of a catalyst, the catalyst is within the electrochemical reactor, generally, within the electrochemical reactor cell. However, decisions as to which zones to use for oxygen-containing gas stream and the other gas stream, and the location of catalyst and inert support, if any, will depend on which arrangement is most suitable for the particular application of the present invention. Determination of an optimal arrangement is well within the ability of one of ordinary skill to obtain without undue experimentation.

The following examples will serve to illustrate certain specific embodiments of the herein disclosed invention. These examples should not, however, be construed as limiting the scope of the novel invention, as there are many variations which may be made thereon without departing from the spirit of the disclosed invention, as those of skill in the art will recognize.

EXAMPLES OF THE INVENTION

GENERAL

Temperatures are in degrees Celsius, °C.

Percents are weight percents.

All the dense phase ceramic tubes were adapted for testing in conversion of methane by the following procedure. Tube dimensions were 6.35 mm OD×4.88 mm ID and, typically, about 30 cm length. Tube ends, inside and out, were painted with a gas-impervious metallic paint to limit any oxygen transfer at the seals and to contribute some superficial structural integrity. The malleable metal ferrules used to seat against the metallic paint were designed for use at high temperatures of reaction and fabricated of materials soft enough not to crack the ceramic tube when the ferrules were compressed onto the tube ends. Development of coke deposits on stainless steel surfaces exposed to organic containing gas at reaction conditions, such as in compression end fittings, where prevented by coating these surfaces with the inert metallic paint. Alternatively, for runs in which seals to the ceramic tubes ends were not subjected to high temperatures, inert quartz tubes were cemented to the ceramic tubes. A pressure above ambient, typically about 15 cm of $H_2O$ head, was maintained in the ceramic tube reactor by means of a downstream water bubblier.

The methane conversion test unit monitored all process conditions and collected experimental data. The unit was controlled with commercially available process control software using a Micro VAX 2000 computer. On-line gas analysis was provided by a Hewlett-Packard 5890 gas chromatograph with VG Multichrom GC software operated on a Micro VAX II computer. Reactor effluent gas was analyzed from slip-steam gas samples. A 5 Å molecular sieve column (⅛ in dia×1.5 ft) was used to separate argon (internal standard) nitrogen, methane, and carbon monoxide. A Porpak N column (⅛ in dia×10 ft) was used to separate carbon dioxide. These columns were configured to a 10 port Valco valve to control gas separation. A thermal conductivity detector measured peak areas.

Generally, catalysts for methane conversion are loaded in a ceramic reactor in a plug flow arrangement with quartz wool packing holding the catalyst bed in position.

Typically, feed gas containing 20 mol percent argon and 80 mol percent methane was fed through the reactor at a flow rate of about 2 cm³/min to about 14 cm³/min measured at ambient temperature and near ambient pressure. Several steps of increasing reaction temperature in a range from 450° C. to 730° C. and, in some runs, to higher temperatures were included in each run. At each step of temperature, gas samples were taken and analyzed by GC at various time intervals of several minutes.

Example 1

In this example cobalt atoms replaced about a third of the iron atoms in a general $Sr_2Fe_3O_8$ non-perovskite phase. Specifically, this ceramic powder had the desired crystalline structure and is represented by empirical oxide formula $$SrCo_{0.5}FeO_8$$

Using the indirect method for making a ceramic core of a mixed metal oxide material having a desired structure, a 1.5 kg amount of cobalt nitrate hexahydrate, $Co(NO_3)_2 \cdot 6H_2O$, was is dissolved in about 0.5 kg of methanol, $CH_3OH$. Gravimetric analysis of this solution determined the cobalt concentration was $2.56 \times 10^{-3}$ gram atoms of cobalt per gram of solution. Into a 1000 mL Nalgeen container were placed a 584.79 g amount of the cobalt solution 442.86 g of strontium carbonate, $SrCO_3$, and 239.55 g iron oxide, $Fe_2O_3$, along with Zirconia milling media. The container was placed on rollers and the contents ball-milled for about 16 hr. The resulting slurry was recovered from the container, dried in a Pyrex dish on a hot plate to a past like consistency, and then in a drying oven at about 90° C. in air. The resulting solid was crushed to a powder which passed through a #60 mesh screen. The powder was calcined at a temperature of 850° C. for a period of 8 hr in stagnant air. The powder was cooled to ambient temperature and the steps of crushing and calcining were repeated. The resulting ceramic powder was characterized by XRD and SEM analysis, and the particle size distribution measured using a laser light scattering technique. This ceramic powder was found to have the oxide formula of $SrCo_{0.5}FeO_x$ and the desired layered structure. The ceramic powder was then ready to be used in fabrication of a solid ceramic core.

The mean particle size was determined to be approximately 5 micron. The material was analyzed by ICP and found to contain 38.7% Sr, 2.5% Co and 23.9% Fe (estimated accuracy of these results: ±5% of mount present). The XRD powder pattern shows that the material is highly crystalline with only the new strontium iron-cobalt oxide XRD powder pattern observed.

The powder X-ray diffraction lines for crystalline strontium iron-cobalt oxide of Example 1 are set out below:

| Interplanar Spacing d,[1] Å | Assigned Strength[2] | Relative Intensity |
|---|---|---|
| 9.515 | W | 5 |
| 4.81 | VW | 3 |
| 3.63 | W | 5 |
| 3.17 | W | 6 |
| 2.94 | W | 6 |
| 2.77 | M-S | 30 |
| 2.76 | M-S | 33 |
| 2.72 | VS | 100 |
| 2.51 | M | 18 |
| 2.40 | W | 4 |
| 2.39 | VW | 3 |
| 2.23 | W | 6 |
| 2.08 | W-M | 9 |
| 1.96 | M | 22 |
| 1.90 | W-M | 10 |
| 1.600 | W | 5 |
| 1.592 | W-M | 9 |
| 1.587 | M | 12 |
| 1.566 | W | 6 |
| 1.471 | W | 6 |
| 1.363 | W | 6 |
| 1.234 | VW | 3 |

[1] Angstroms
[2] VW = Very weak; W = weak; M = medium; S = strong; VS = Very strong

Example 2

First in fabrication of the solid ceramic core was to prepare a slip which consisted of the ceramic powder mixed with solvent and binder, dispersant, and plasticizer additives. The solvent used was a mixture of xylene and butanol mixed in the ratio of 89 g of xylene and 22 g butanol. The binder used was a thermosetting acryloid resin identified as AT-51 by supplier Rohm-Hass Co. As supplied AT-51 is 50 weight percent active resin in xylene-butanol solvent. The dispersant used was fish oil obtained from Kellogg Co. and diluted 20 percent in xylene-butanol solvent. The plasticizer used was a liquid identified as Santicizer-160 by supplier Monsanto. Into a 1000 mL Nalgeen container were placed a 200 g amount of the ceramic powder, 60.2 g of xylene-butanol solvent, 78/22, and 22.4 g binder AT-51, 10.93 g plasticizer S-160, 6.78 g dilute fish oil along with Zirconia milling media. The container was placed on rollers and the contents ball-milled for about 16 hr. Slip was recovered from the container and then de-aerated in a vacuum chamber. The resulting slip was cast into a thin tape using a doctor blade technique in which an adjustable blade moves over an amount of slip on a level glass plate to spread the slip into the form of a thin tape. Solvent was removed from the tape by evaporation in air at room temperature for a period of 25 min. The resulting material was further blended in a Barbender mixer to obtain a workable plastic mass which was extruded through a steel die with an adjustable insert to form a green ceramic tube. The green tube was heated slowly to remove binder and other volatile organic compounds prior to sintering the tube at a temperature of 1175° C. for a period of 5 hr in an oxygen atmosphere. The resulting ceramic was characterized by XRD and SEM analysis. This ceramic core, identified as Core SCF-2, was found to have an oxide formula $SrCo_{0.5}FeO_8$. The XRD powder pattern showed that the material was highly crystalline with only the new strontium iron cobalt oxide XRD powder pattern observed.

The powder X-ray diffraction lines for crystalline strontium iron cobalt oxide material of Example 2 are set out below:

| Interplanar Spacing d,[1] Å | Assigned Strength[2] | Relative Intensity |
|---|---|---|
| 9.504 | VW | 4 |
| 3.83 | VW | 4 |
| 3.17 | W | 6 |
| 3.13 | M-S | 25 |
| 2.77 | M-S | 31 |
| 2.75 | M-S | 35 |
| 2.72 | VS | 100 |
| 2.40 | VW | 4 |
| 2.39 | VW | 3 |
| 2.23 | W-M | 7 |
| 2.09 | W | 6 |
| 2.08 | W | 6 |
| 1.954 | M | 18 |
| 1.943 | W | 5 |
| 1.938 | W | 5 |
| 1.917 | M | 20 |
| 1.901 | W | 6 |
| 1.635 | W-M | 9 |
| 1.592 | W-M | 9 |
| 1.584 | M | 15 |
| 1.568 | W | 6 |
| 1.371 | VW | 3 |
| 1.363 | W-M | 7 |

[1]Angstroms
[2]VW = very weak; W = weak; M = medium; S = strong; VS = very strong Unit cell volumes are calculated from the unit cell dimensions, which are determined from the indexed powder patterns—a normal analytical procedure for analysis of XRD powder patterns.

| Source | a, Å | b, Å | c, Å | volume, Å$^3$ |
|---|---|---|---|---|
| Example 1 Air cooled | 11.084 | 18.996 | 5.515 | 1161.2 |
| Example 1 N$_2$ cooled | 11.121 | 19.046 | 5.515 | 1168.1 |
| Example 2 Air cooled | 11.110 | 19.048 | 5.508 | 1165.6 |
| Sr$_7$Fe$_{10}$O$_{22}$ Lucchini[a] | 11.157 | 19.021 | 5.545 | 1176.7 |
| Sr$_4$Fe$_6$O$_{13}$ Kanamaru[b] | 11.172 | 18.983 | 5.564 | 1180.0 |
| Sr$_4$Fe$_6$O$_{13}$ Yoshiasa[c] | 11.103 | 18.924 | 5.572 | 1170.8 |

[a]Lucchini et al., "X-Ray Characterization of 7SrO.5Fe$_2$O$_3$", Journal of The American Ceramic Society, vol. 57, No. 1, pp. 42–43 (1974)
[b]Kanamaru et al., "Crystallographic properties of and Mossbauer effect in Sr$_4$Fe$_6$O$_{13}$", J. Phys. Chem. Solids., vol. 33, pp. 1169–1171 (1972)
[c]Yoshiasa et al., "Structure of Sr$_4$Fe$_6$O$_{13}$", a New Perovskiet-Derivative in the Sr—Fe—O System" Met. Res. Bull., vol. 21, pp. 175–181 (1986)

The material was indexed on the orthorhombic unit cell and the cell parameters were compared to the best single crystal of pure Sr$_4$Fe$_6$O$_{13}$. Note that the unit cell volumes of new crystalline SICO composition are smaller than cell volumes of Sr$_4$Fe$_6$O$_{13}$. Note also that the c-axis parameters of new crystalline strontium iron cobalt oxide composition are shortened compared with c-axis parameters of Sr$_4$Fe$_6$O$_{13}$.

The nature of the unit cell volume changes upon the synthesis of solid solutions is described in standard inorganic texts such as "Structural Inorganic Chemistry"Vol. 5, A. F. Wells, Clarendon Press, Oxford, 1984, p. 1294. "For two element in the same group in our classification the range of composition over which solid solutions are formed depends on the relative sizes of the two atoms. This is to be expected, since if some of the atoms in a structure are replaced (at random) by others of a different size, distortion of the structure must occur and the cell dimensions alter as the concentration of the solute increases. To a first approximation they vary linearly with the atomic percentage of the solute (Vegard's law), though in many cases this law is not exactly obeyed."

Example 3

Figure 8:
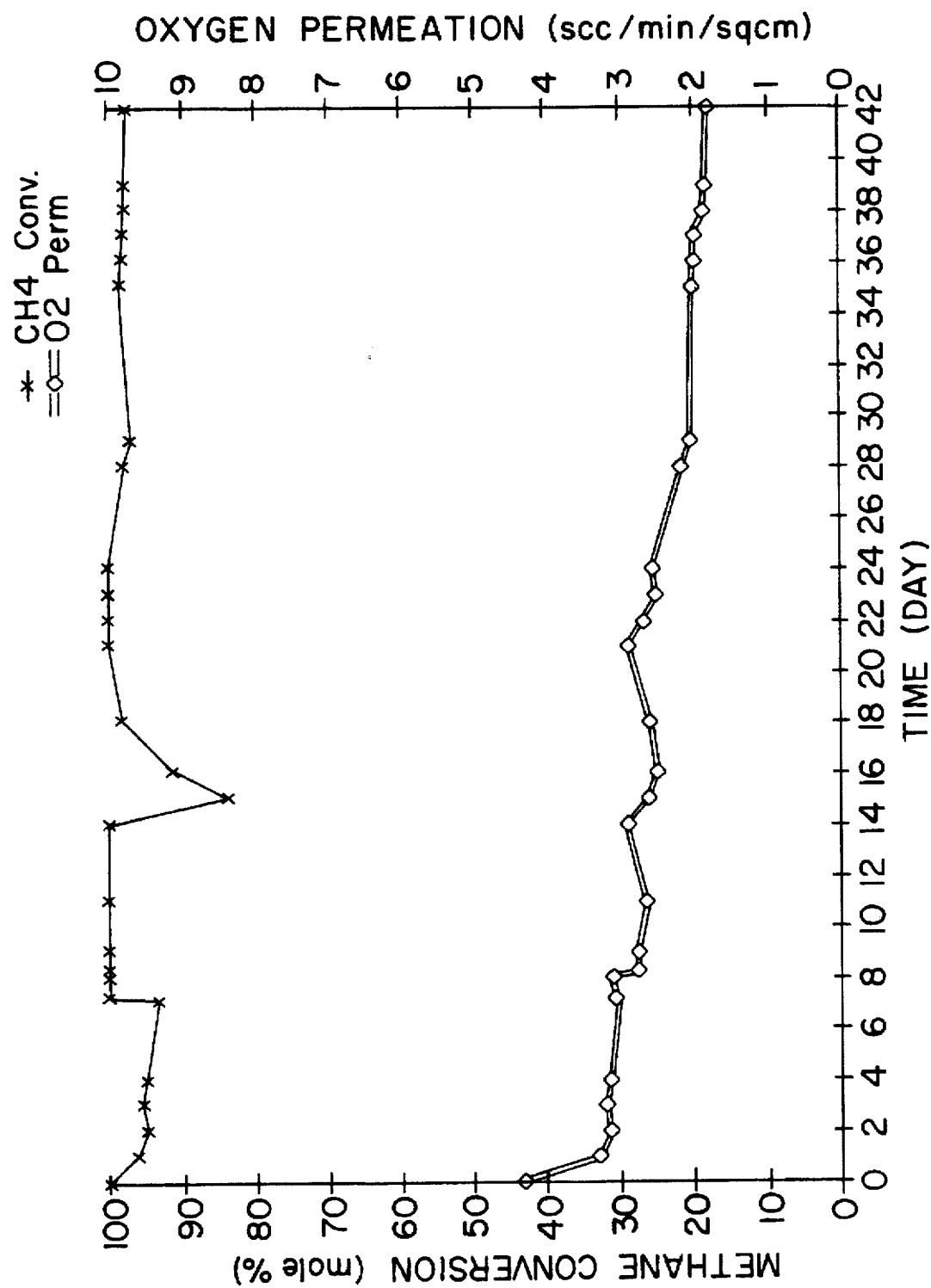
FIG. 8 shows performance of a crystalline mixed metal oxide composition of the present invention in a ceramic membrane throughout a 42 day test with mixed feed.

In this example a ceramic core made according to the method of Example 2 and identified as Core SCF-2B was tested in the methane conversion unit as described above. During testing for this example the ceramic core contained a 1.5 g bed of a reforming type catalyst. A mixed gaseous feed containing 16.5 mol percent methane, 47.2 mol percent hydrogen, 9.9 mol percent argon, 17.5 mol percent carbon monoxide, and 8.9 mol percent carbon dioxide was used in this test. Argon was used as an internal analytical standard to obtain mass balance data. The feed rate of mixed gas was in a range from 50 to 400 cm$^3$/min at standard conditions. Throughout a test period of 42 days at 900° C. temperature methane conversions in a range upward from about 80 mol percent, typically near 100 mol percent, were observed. During this extended test, permeation of oxygen was at rates in a range from about 1.8 cm/min to about 4.6 cm/min (1.8 to 4.6 cm$^3$/min at standard conditions per cm$^2$ of wall area). Conversion of oxygen transported as oxygen ions through dense ceramic membrane SCF-2B was very near 100 mol percent. Major oxidation products obtained the at lower feed rates were carbon dioxide and water, but at the higher feed rates a syngas containing carbon monoxide and hydrogen was obtained. Membrane performance demonstrated by this example is shown in FIG. 8.

Example 4

Figure 9:
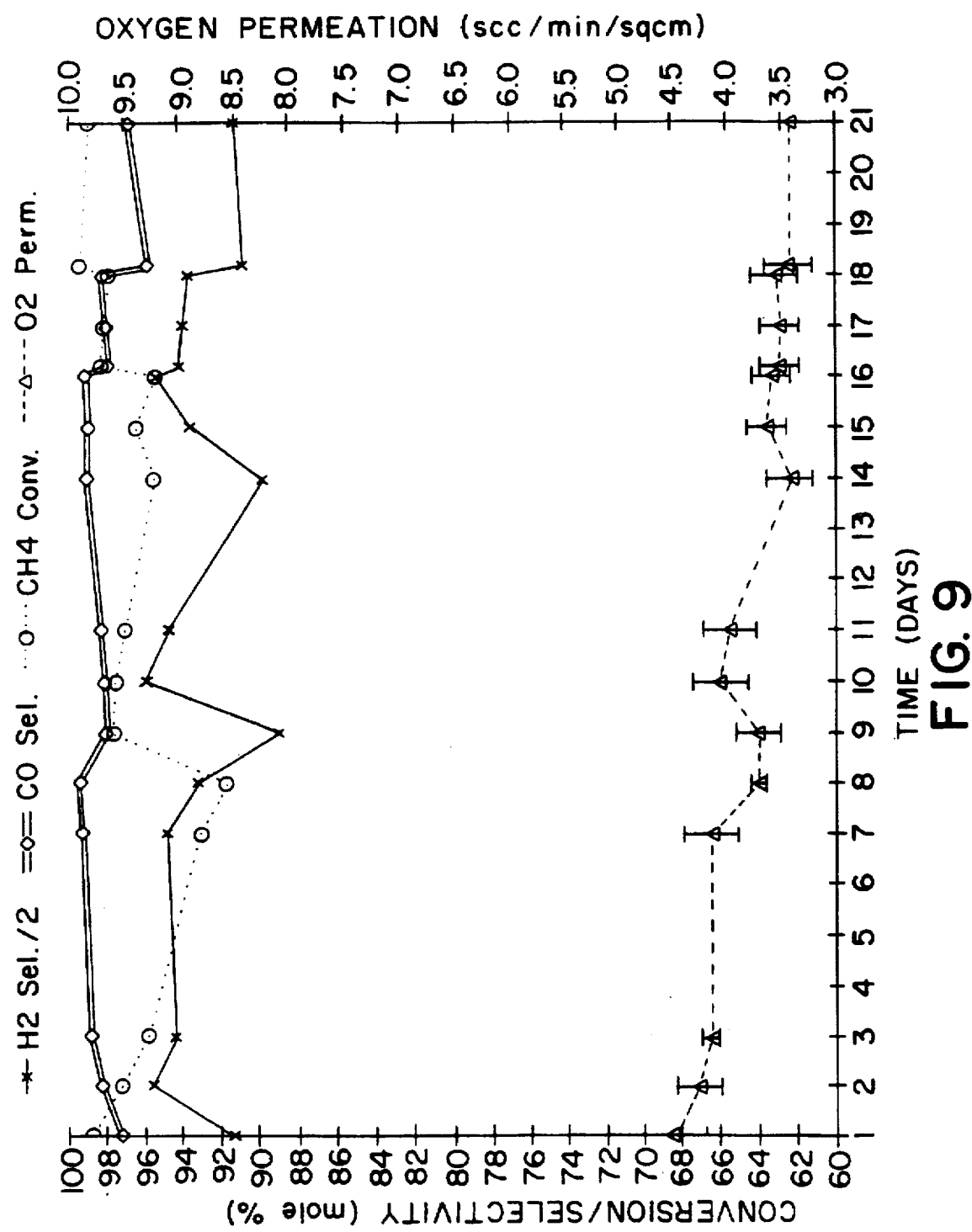
FIG. 9 shows performance of a crystalline mixed metal oxide composition of the present invention in a ceramic membrane throughout a 21 day test with methane/argon feed.

In this example a ceramic core made according to the method of Example 2 and identified as Core SCF-2C was tested in the methane conversion unit as described above. During testing for this example the ceramic core contained a 2 g bed of a reforming type catalyst. A mixed gaseous feed containing 80 mole percent of methane and 20 mole percent of argon was used in this test. Argon was used as an internal standard. The feed rate of mixed gas was in a range from 44 to 55 cm$^3$/min at standard conditions. Throughout a test period of 21 days at 900° C. temperature methane conversions in a range upward from about 90 mol percent to very near 100 mol percent, were observed. Conversion of oxygen transported as oxygen ions through dense ceramic membrane SCF-2C was very near 100 mol percent. Membrane performance demonstrated by this example is shown in FIG. 9.

Example 5

The ceramic core made according to the method of Example 2 and identified as Core SCF-2 is tested in the methane conversion unit as described above. During testing for this example the ceramic core contains a bed of catalyst, 0.5 g, sized to 20/40 mesh size. The. methane gas feed rate is 2.1 cm$^3$/min at standard conditions. At a 850° C. temperature and methane conversion of 99 mol percent the selectivity to hydrogen, carbon monoxide and carbon dioxide are, respectively, 180 mol percent, 92 mol percent, and 8 mol percent based on a mole of methane. Conversion of oxygen transported as oxygen ions through gas-impervious wall is very near 100 mol percent. During this run, perme-

Example 6

In this example ceramic core made according to the method of Example 2 and identified as Core SCF-2 is again tested in the methane conversion unit as described above. During testing for this example, however, the ceramic core contains a bed of catalyst, 0.5 g, sized to 20/40 mesh size. The methane gas feed rate is 3.6 cm$^3$/min at standard conditions. At a 800° C. temperature and methane conversion of 30 mol percent the selectivity to hydrogen, carbon monoxide and carbon dioxide are, respectively, 186 mol percent, 98 mol percent, and 2 mol percent based on a mole of methane. Conversion of oxygen transported as oxygen ions through gas-impervious wall is very near 100 mol percent. During this run, permeation of oxygen is at rates of about 0.043 cm$^3$/min.

Example 7

In this example a ceramic core made according to the method of Example 2 and identified as Core SCF-2A is tested in the methane conversion unit as described above. During testing for this example, however, the ceramic core contains a bed of catalyst, 0.42 g, sized to 20/40 mesh size. The methane gas feed rate is 3.7 cm$^3$/min at standard conditions. At a 850° C. temperature and methane conversion of very near 100 mol percent the selectivity to hydrogen, carbon monoxide and carbon dioxide are, respectively, 126 mol percent, 72 mol percent, and 28 mol percent based on a mole of methane. Conversion of oxygen transported as oxygen ions through gas-impervious wall is very near 100 mol percent. During this run, permeation of oxygen is at rates in a range from about 0.2 cm$^3$/min to about 0.4 cm$^3$/min.

Comparative Example A

A mixed metal oxide ceramic powder having a perovskite structure and oxide formula $SrCo_{0.8}Fe_{0.2}O_x$ was made using the method of Example 1 except that appropriate amounts of $SrCO_3$, $Co(NO_3)_2 \cdot 6H_2O$, and $Fe(NO_3)_3 \cdot 9H_2O$ were mixed and milled in methanol with $ZrO_2$ media for 20 hr.. A ceramic core was fabricated from the resulting ceramic powder by the method of Example 2 and identified as Core A.

Comparative Example B

In this example ceramic core identified as Core A is tested in the methane conversion unit as described above. During testing for this example the ceramic core contains a bed of catalyst, 0.25 g, sized to 20/40 mesh size. The methane gas feed rate is 14 cm$^3$/min at ambient conditions. Testing includes seven steps of increasing reaction temperature from 450° C. to 730° C. Methane conversion increases stepwise with increasing temperature of reaction from of 5 mol percent to 38 mol percent. At a 730° C. average temperature methane conversion is 38 mol percent and selectivities to hydrogen, carbon monoxide and carbon dioxide are, respectively, 180 mol percent, 92 mol percent, and 8 mol percent based on a mole of methane. Conversion of oxygen transported as oxygen ions through gas-impervious wall is 100 mol percent. During this run, permeation of oxygen is at rates in a range from about 0.5 cm$^3$/min to about 3.5 cm$^3$/min.

However, after relatively short period of time under test conditions, Core A fractured, perhaps because of phase change and thereby to lost any ability to selectively separate and transport oxygen.

Comparative Example C

A mixed metal oxide ceramic powder having a perovskite structure and oxide formula $La_{0.2}Sr_{0.8}Co_{0.4}Fe_{0.6}O_x$ was made using the method of Example 1. The source of lanthanum used in preparation of this ceramic powder was lanthanum carbonate, $La_2(CO_3)_3$. The ceramic core fabricated from the resulting ceramic powder, identified as Core C, however, fractured in testing without demonstrating an ability to selectively separate and transport oxygen.

$ABO_3$ perovskite-type crystal structures are often not stable to changes in oxygen pressure and/or temperatures which may be required for use in many desired applications.

Example 8 & Comparative Example D

The following examples further document improved physical properties of mixed metal oxide compositions according to the present invention over a known $ABO_3$ perovskite-type material. At high temperatures the crystalline structures of both materials were determined at several oxygen pressures. For these runs a Scintag PAD X vertical goniometer powder diffractometer equipped with a high temperature furnace was used.

Comparative Example D

Figure 10:
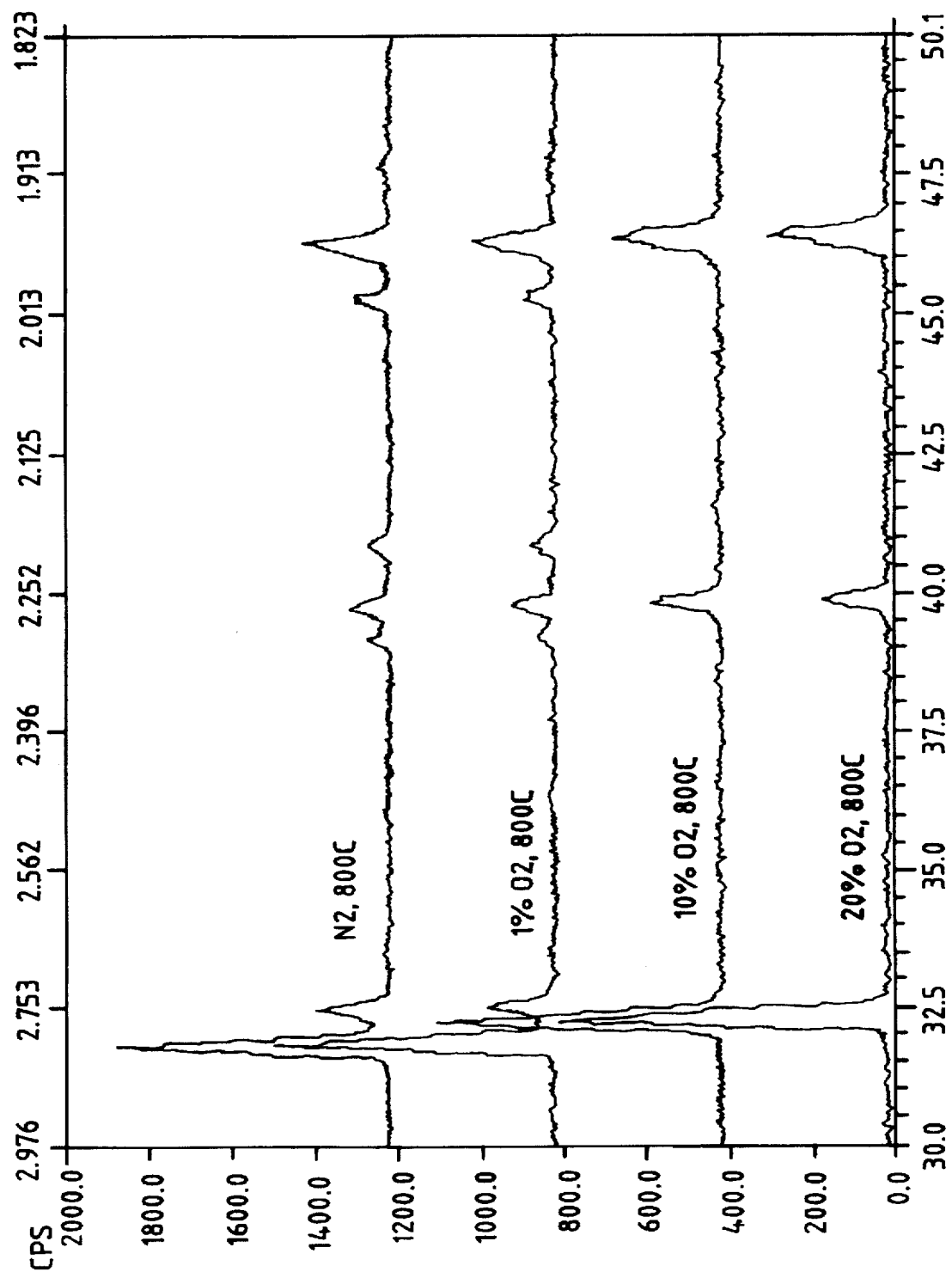
FIG. 10 shows unstable phase behavior of a known $ABO_3$ perovskite-type material in runs at 800° C. and oxygen levels from 20 percent down to 0 percent using a Scintag PAD X vertical goniometer powder diffractometer equipped with a high temperature furnace.

Changes in phase behavior were determined for a known $ABO_3$ perovskite-type material ($SrCo_{0.8}Fe_{0.2}O_x$ of Comparative Example B) in runs at 800° C. and oxygen levels from 20 percent down to 0 percent. Results obtained are shown in FIG. 10. It is important to note the very large change in the position of a Bragg peak near 32 degrees which indicates a phase transition. With phase transition the material expands substantially. Analysis shows that an oxygen-vacancy-ordered phase expands about 2 percent in volume compared with that of the cubic phase. Such phase change in a ceramic component exposed to different oxygen levels results in strain that leads to fracture of the ceramic material, although the structure is still a perovskite, i.e.. a cubic lattice of unit cells each containing a metal ion (A) at the center of the cell, different metal ions (B) in corner positions of the cubic cell, and oxygen ions at the midpoint of each cube edge.

Example 8

Figure 11:
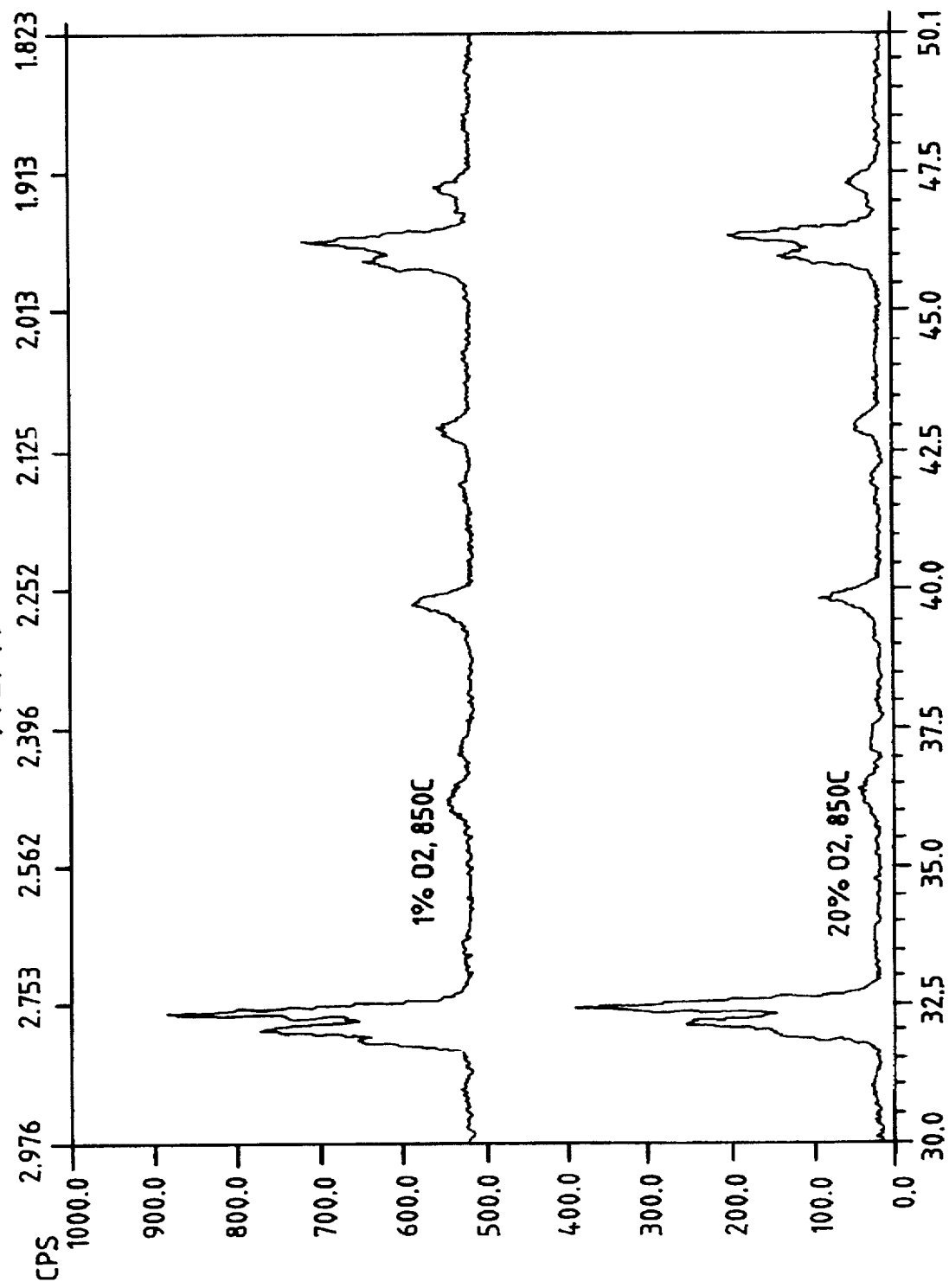
FIG. 11 shows stable phase behavior for a crystalline mixed metal oxide composition of the present invention in runs at 850° C. and oxygen levels from 20 percent down to 1 percent using a Scintag PAD X vertical goniometer powder diffractometer equipped with a high temperature furnace.

Phase behavior was determined for a mixed metal oxide composition $SrFeCo_{0.5}O_6$ in runs at 850° C. and oxygen levels from 20 percent down to 1 percent. Results I obtained are shown in my FIG. 11. In contrast to the perovskite-type crystal structure, the $SrFeCo_{0.5}O_6$ material exhibited a remarkable stability. There is no significant difference in the positions of observed Bragg peaks which indicates no phase transition.

As these data show, the crystalline mixed metal oxide compositions of present invention are not a trivial mechanical mixture of a perovskite material and a non-perovskite material. In the layered crystalline structure of compositions according to the present invention, different atomic arrays are stacked in a coherent and periodic fashion which may, advantageously, lead to desired new properties. In these layered crystalline structures, the different atomic arrays are matched to each other in such a particular arrangement as to have proper bond distances between all atoms in the whole structure. Otherwise a mechanical mixture of multiply materials would be obtained.

That which is claimed is:

1. A crystalline mixed metal oxide composition represented by $$D_\alpha E_{\alpha+\beta} O_\delta$$

where D comprises at least one metal selected from the group consisting of magnesium, calcium, strontium, and barium, E comprises at least one element selected from the group consisting of vanadium, chromium, manganese, iron, cobalt, and nickel, $\alpha$ is a number in a range from about 1 to about 4, $\beta$ is a number in a range upward from 0.1 to about 20, such that $$1.1 < (\alpha+\beta)/\alpha \leq 6,$$

and $\delta$ is a number which renders the compound charge neutral, wherein the crystalline mixed metal oxide composition has an crystalline structure comprising layers having a perovskite structure held apart by bridging layers having a different structure identifiable by means of powder X-ray diffraction pattern analysis, the composition such that a dense ceramic membrane comprising the composition exhibits electron conductivity and oxygen ion conductivity, and ability to separate oxygen from a gaseous mixture containing oxygen and one or more other volatile components by means of the conductivities.

2. The composition according to claim 1 wherein the crystalline mixed metal oxide has a powder X-ray diffraction pattern as follows:

| Principal XRD Lines | |
|---|---|
| Interplanar Spacing d, Å | Assigned Strength |
| 9.52 ± .05 | Weak |
| 3.17 ± .05 | Weak |
| 2.77 ± .05 | Medium–Strong |
| 2.76 ± .05 | Medium–Strong |
| 2.73 ± .03 | Very Strong |
| 2.08 ± .03 | Weak–Medium |
| 1.96 ± .02 | Medium |
| 1.90 ± .02 | Weak–Medium |
| 1.592 ± .009 | Weak–Medium |
| 1.587 ± .009 | Medium |
| 1.566 ± .009 | Weak. |

3. A dense ceramic membrane permeable to oxygen comprising the crystalline mixed metal oxide composition according to claim 1.

4. A crystalline mixed metal oxide composition represented by $$(D_{1-y}M'_y)_\alpha E_{\alpha+\beta} O_\delta$$

where D is a metal selected from the group consisting of magnesium, calcium, strontium, and barium, M' comprises at least one other metal selected from the group consisting of magnesium, calcium, strontium, barium, yttrium, lanthanum, copper, zinc, silver, cadmium, gold, and mercury, with the proviso that D and M' are different metals, E is at least one element selected from the group consisting of vanadium, chromium, manganese, iron, cobalt, and nickel, y is a number in a range from about 0.01 to about 0.95, $\alpha$ is a number in a range from about 1 to about 4, $\beta$ is a number in a range from 0.1 to about 20, such that $$1.1 < (\alpha+\beta)/\alpha \leq 6,$$

and $\delta$ is a number which renders the compound charge neutral, wherein the crystalline mixed metal oxide composition has a crystalline structure comprising layers having a perovskite structure held apart by bridging layers having a different structure identifiable by means of powder X-ray diffraction pattern analysis, the composition such that a dense ceramic membrane comprising the composition exhibits electron conductivity and oxygen ion conductivity, and ability to separate oxygen from a gaseous mixture containing oxygen and one or more other volatile components by means of the conductivities.

5. The mixed metal oxide composition according to claim 4, wherein y is a number in a range from 0.1 to about 0.5, and $\beta$ is a number in a range from about 0.1 to about 6.

6. The composition according to claim 5 wherein the crystalline mixed metal oxide has a powder X-ray diffraction pattern as follows:

| Principal XRD Lines | |
|---|---|
| Interplanar Spacing d, Å | Assigned Strength |
| 9.52 ± .05 | Weak |
| 3.17 ± .05 | Weak |
| 2.77 ± .05 | Medium–Strong |
| 2.76 ± .05 | Medium–Strong |
| 2.73 ± .03 | Very strong |
| 2.08 ± .03 | Weak–Medium |
| 1.96 ± .02 | Medium |
| 1.90 ± .02 | Weak–Medium |
| 1.592 ± .009 | Weak–Medium |
| 1.587 ± .009 | Medium |
| 1.566 ± .009 | Weak |

7. A crystalline mixed metal oxide composition represented by $$D_\alpha(E_{1-x}G_x)_{\alpha+\beta} O_\delta$$

where D is a metal selected from the group consisting of magnesium, calcium, strontium, and barium, E is an element selected from the group consisting of vanadium, chromium, manganese, iron, cobalt, and nickel, G comprises at least one other element selected from the group consisting of vanadium, chromium, manganese, iron, cobalt, nickel, niobium, molybdenum, technetium, ruthenium, rhodium, palladium, indium, tin, antimony, rhenium, lead, and bismuth, with the proviso that E and G are different elements, x is a number in a range from about 0.01 to about 0.95, $\alpha$ is a number in a range from about 1 to about 4, $\beta$ is a number in a range from 0.1 to about 20, such that $$1.1 > (\alpha+\beta)/\alpha \leq 6,$$

and $\delta$ is a number which renders the compound charge neutral, wherein the crystalline mixed metal oxide composition has a crystalline structure comprising layers having a perovskite structure held apart by bridging layers having a different structure identifiable by means of powder X-ray diffraction pattern analysis, the composition such that a dense ceramic membrane comprising the composition exhibits electron conductivity and oxygen ion conductivity, and ability to separate oxygen from a gaseous mixture containing oxygen and one or more other volatile components by means of the conductivities.

8. A crystalline mixed metal oxide composition represented by $$(D_{1-y}M'_y)_\alpha(E_{1-x}G_x)_{\alpha+\beta} O_\delta$$

where D is a metal selected from the group consisting of magnesium, calcium, strontium, and barium, M' is a metal selected from the group consisting of magnesium, calcium, strontium, barium, copper, zinc, silver, cadmium, gold, and mercury, E is an element selected from the group consisting of vanadium, chromium, manganese, iron, cobalt, and nickel, G is an element selected from the group consisting of vanadium, chromium, manganese, iron, cobalt, nickel, niobium, molybdenum, technetium, ruthenium, rhodium, palladium, indium, tin, antimony, rhenium, lead, and bismuth, with the proviso that D, E, G and M' are different elements, y is a number in a range from about 0.1 to about 0.5, x is a number in a range from about 0.1 to about 0.8, $\alpha$ is a number in a range from about 1 to about 4, $\beta$ is a number in a range from 0.1 to about 20, such that $$1.1 < (\alpha+\beta)/\alpha \leq 6,$$

and $\delta$ is a number which renders the compound charge neutral, wherein the crystalline mixed metal oxide composition has an crystalline structure comprising layers having a perovskite structure held apart by bridging layers having a different structure identifiable by means of powder X-ray diffraction pattern analysis, the composition such that a dense ceramic membrane comprising the composition exhibits electron conductivity and oxygen ion conductivity, and ability to separate oxygen from a gaseous mixture containing oxygen and one or more other volatile components by means of the conductivities.

9. The mixed metal oxide composition according to claim 8 wherein x is a number in a range from 0.1 to 0.8, and $\beta$ is a number in a range from about 0.1 to about 6.

10. The mixed metal oxide composition according to claim 9 wherein D is strontium, E is iron, and G is cobalt.

11. The composition according to claim 10 wherein the crystalline mixed metal oxide has a powder X-ray diffraction pattern as follows:

| Principal XRD Lines | |
|---|---|
| Interplanar Spacing d, Å | Assigned Strength |
| 9.52 ± .05 | Weak |
| 3.17 ± .05 | Weak |
| 2.77 ± .05 | Medium–Strong |
| 2.76 ± .05 | Medium–Strong |
| 2.73 ± .03 | Very Strong |
| 2.08 ± .03 | Weak–Medium |
| 1.96 ± .02 | Medium |
| 1.90 ± .02 | Weak–Medium |
| 1.592 ± .009 | Weak–Medium |
| 1.587 ± .009 | Medium |
| 1.566 ± .009 | Weak |

12. A dense ceramic membrane permeable to oxygen comprising the crystalline mixed metal oxide composition, according to claim 10.

13. The mixed metal oxide composition according to claim 8 wherein x is a number in a range from 0.1 to 0.8, y is a number in a range from 0.1 to about 0.5, and $\beta$ is a number in a range from about 0.1 to about 6.

14. The mixed metal oxide composition according to claim 13 wherein D is strontium, E is iron, and G is cobalt.

15. The composition according to claim 14 wherein the crystalline mixed metal oxide has a powder X-ray diffraction pattern as follows:

| Principal XRD Lines | |
|---|---|
| Interplanar Spacing d, Å | Assigned Strength |
| 9.52 ± .05 | Weak |
| 3.17 ± .05 | Weak |
| 2.77 ± .05 | Medium–Strong |
| 2.76 ± .05 | Medium–Strong |
| 2.73 ± .03 | Very Strong |
| 2.08 ± .03 | Weak–Medium |
| 1.96 ± .02 | Medium |
| 1.90 ± .02 | Weak–Medium |
| 1.592 ± .009 | Weak–Medium |
| 1.587 ± .009 | Medium |
| 1.566 ± .009 | Weak |

16. A dense ceramic membrane permeable to oxygen comprising the crystalline mixed metal oxide composition according to claim 14.

* * * * *

UNITED STATES PATENT AND TRADEMARK OFFICE
CERTIFICATE OF CORRECTION

PATENT NO.: 5,723,074
DATED: March 3, 1998
INVENTOR(S): Uthamalingam Balachandran, Mark S. Kleefisch, Thaddeus P. Kobylinski, Sherry L. Morisette, Shiyou Pei It is certified that error appears in the above-identified patent and that said Letters Patent is hereby corrected as shown below:

| Col. | Line | |
|---|---|---|
| 5 | 35 | reads "$D_\alpha(E_{1-x}G_x)\alpha+\delta O_{67}$" should read --$D_\alpha(E_{1-x}G_x)\alpha+\beta O_\delta$-- |
| 5 | 62 | reads "$(D_{1-y}M'_y)\alpha(E_{1-x}G_x)\alpha+\beta O_\delta$" should read --$(D_{1-y}M'_y)\alpha(E_{1-x}G_x)\alpha+\beta O_\delta$-- |
| 6 | 55 | reads "$Sr_\alpha(FE_{1-x}Co_x)\alpha+\beta O_\delta$" should read --$Sr_\alpha(Fe_{1-x}Co_x)\alpha+\beta O_\delta$-- |
| 20 | 60 | reads "may be s supported on a porous" should read --may be supported on a porous-- |
| 23 | 64 | reads "$\pm 5\%$ of mount present" should read --$\pm 5\%$ of amount present-- |
| 30 | 49 | reads "$1.1>(\alpha+\beta)/\alpha\leq 6$" should read --$1.1<(\alpha+\beta)/\alpha\leq 6$-- |

Signed and Sealed this

Thirteenth Day of October 1998

*Attest:*

BRUCE LEHMAN

*Attesting Officer*    *Commissioner of Patents and Trademarks*